United States Patent
Yun et al.

(10) Patent No.: US 12,038,219 B2
(45) Date of Patent: Jul. 16, 2024

(54) REFRIGERATOR CONTROL METHOD

(71) Applicant: LG ELECTRONICS INC., Seoul (KR)

(72) Inventors: Seokjun Yun, Seoul (KR); Hyoungkeun Lim, Seoul (KR); Junghun Lee, Seoul (KR); Hoyoun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 403 days.

(21) Appl. No.: 17/434,338

(22) PCT Filed: Feb. 13, 2020

(86) PCT No.: PCT/KR2020/002074
§ 371 (c)(1),
(2) Date: Aug. 26, 2021

(87) PCT Pub. No.: WO2020/175828
PCT Pub. Date: Sep. 3, 2020

(65) Prior Publication Data
US 2022/0154994 A1 May 19, 2022

(30) Foreign Application Priority Data
Feb. 28, 2019 (KR) .......... 10-2019-0024018

(51) Int. Cl.
*F25D 11/02* (2006.01)
*F25B 21/04* (2006.01)
*F25D 17/06* (2006.01)

(52) U.S. Cl.
CPC ............ *F25D 11/025* (2013.01); *F25B 21/04* (2013.01); *F25D 17/062* (2013.01)

(58) Field of Classification Search
CPC ................ F25D 11/025; F25D 17/062; F25D 2700/112; F25D 2600/02; F25D 23/04; F25D 11/04; F25B 21/04
See application file for complete search history.

(56) References Cited

U.S. PATENT DOCUMENTS

| | | |
|---|---|---|
| 2018/0031297 A1 | 2/2018 | Kim et al. |
| 2018/0266736 A1 | 9/2018 | Kim et al. |
| 2018/0292119 A1* | 10/2018 | Sung .................... F25D 21/006 |
| 2019/0011158 A1 | 1/2019 | Sul et al. |

FOREIGN PATENT DOCUMENTS

| | | |
|---|---|---|
| EP | 2256446 A2 | 12/2010 |
| KR | 10-1999-0052586 A | 7/1999 |
| KR | 10-2000-0019752 A | 4/2000 |

(Continued)

*Primary Examiner* — Cassey D Bauer
(74) *Attorney, Agent, or Firm* — Bryan Cave Leighton Paisner

(57) ABSTRACT

In a refrigerator control method according to an embodiment of the present invention, a control unit intermittently turns on a temperature sensor on a predetermined cycle when a deep-freezing chamber mode is turned off, so that the temperature sensor senses the internal temperature of a deep-freezing chamber for a first set time, and the sensed internal temperature of the deep-freezing chamber is transmitted to the control unit so as to minimize power consumption.

22 Claims, 9 Drawing Sheets

(56) References Cited

FOREIGN PATENT DOCUMENTS

| KR | 10-2004-0016659 A | 2/2004 |
|----|-------------------|--------|
| KR | 20100056127 A | 5/2010 |
| KR | 20140019594 A | 2/2014 |
| KR | 10-2016-0097648 A | 8/2016 |
| KR | 20170087440 A | 7/2017 |
| KR | 10-1821289 B1 | 1/2018 |
| KR | 10-2019-0005042 A | 1/2019 |

* cited by examiner (a)

(b)

(c)

REFRIGERATOR CONTROL METHOD

This application is a National Stage Application of International Application No. PCT/KR2020/002074, filed on Feb. 13, 2020, which claims the benefit of and priority to Korean Application No. 10-2019-0024018, filed on Feb. 28, 2019, which are hereby incorporated by reference in their entirety for all purposes as if fully set forth herein.

TECHNICAL FIELD

The present invention relates to a method for controlling a refrigerator.

BACKGROUND ART

In general, a refrigerator is a home appliance for storing food at a low temperature, and includes a refrigerating compartment for storing food in a refrigerated state in a range of 3° C. and a freezing compartment for storing food in a frozen state in a range of −20° C.

However, when food such as meat or seafood is stored in the frozen state in the existing freezing compartment, moisture in cells of the meat or seafood are escaped out of the cells in the process of freezing the food at the temperature of −20° C., and thus, the cells are destroyed, and taste of the food is changed during an unfreezing process.

However, if a temperature condition for the storage compartment is set to a cryogenic state that is significantly lower than the current temperature of the freezing temperature. Thus, when the food quickly passes through a freezing point temperature range while the food is changed in the frozen state, the destruction of the cells may be minimized, and as a result, even after the unfreezing, the meat quality and the taste of the food may return to close to the state before the freezing. The cryogenic temperature may be understood to mean a temperature in a range of −45° C. to −50° C.

For this reason, in recent years, the demand for a refrigerator equipped with a deep freezing compartment that is maintained at a temperature lower than a temperature of the freezing compartment is increasing.

In order to satisfy the demand for the deep freezing compartment, there is a limit to the cooling using an existing refrigerant. Thus, an attempt is made to lower the temperature of the deep freezing compartment to a cryogenic temperature by using a thermoelectric module (TEM).

Korean Patent Publication No. 2018-097648 (Aug. 18, 2018) (hereinafter, referred to as a Prior Art) discloses a refrigerator having a deep freezing compartment using a thermoelectric module.

According to the prior art, an evaporator provided as a refrigerant pipe, through which a refrigerant passing through an expansion valve flows, is attached to a heat generation surface of the thermoelectric module so that heat absorbed into a heat absorption surface of the thermoelectric module and then transferred to a heat generation surface is released to the evaporator.

The thermoelectric module has a characteristic that a semiconductor is disposed between the heat absorption surface made of a ceramic material and the heat generation surface, and when power is applied, one surface acts as the heat absorption surface, and the other surface acts as the heat generation surface.

The heat absorption surface of the thermoelectric module is exposed to the deep freezing compartment to lower the temperature of the deep freezing compartment, and the heat generation surface is attached to the evaporator to rapidly dissipate heat to the outside.

Although the prior art discloses an example in which the evaporator is applied as a heat sink that absorbs heat emitted from the heat generation surface of the thermoelectric element, it is not disclosed at all about how to control a temperature inside the deep freezing compartment.

In detail, there is no disclosure on how to maximize cooling capacity and efficiency of the thermoelectric module and minimize power consumption by controlling an operation of a deep freezing compartment fan depending on when the deep freezing compartment mode is in on and off states.

DISCLOSURE OF THE INVENTION

Technical Problem

The present invention is proposed to overcome the limitations of the related art as described above.

Technical Solution

In a refrigerator control method according to an embodiment of the present invention, a controller intermittently turns on a temperature sensor on a predetermined cycle when a deep freezing compartment mode is turned off, so that the temperature sensor detects an internal temperature of a deep freezing compartment for a first set time, and a sensed internal temperature of the deep freezing compartment is transmitted to the controller so as to minimize power consumption.

In addition, when the deep freezing compartment mode is in an off state, the deep freezing compartment temperature may be maintained at a freezing compartment satisfactory temperature to minimize a phenomenon that a freezing compartment load increases due to a thermal load generated in the deep freezing compartment.

Advantageous Effects

According to the method for controlling the refrigerator according to the embodiment of the present invention for solving the above problems, the following effects are obtained.

First, the operation conditions of the deep freezing compartment fan may be differently set and controlled for each case in which the deep freezing compartment mode is turned on and off to minimize the power consumption of the refrigerator.

Second, in the case in which the deep freezing compartment mode is in the off state, the deep freezing compartment temperature may be controlled to be maintained to the freezing compartment satisfactory temperature to prevent the deep freezing compartment temperature from being unnecessary cooled to the cryogenic state in spite of not using the deep freezing compartment, thereby minimizing the power consumption.

Third, the deep freezing compartment temperature may be maintained to the freezing chamber satisfactory temperature even when the deep freezing compartment mode is in the off state to reduce the time taken to cool the deep freezing compartment to the deep freezing compartment satisfactory temperature when the deep freezing compartment mode is turned on.

Fourth, even when the deep freezing compartment mode is turned off, the deep freezing compartment temperature is maintained at the freezing chamber satisfactory temperature, thereby preventing the heat load generated inside the deep freezing compartment from acting as the factor of increasing the freezing compartment load.

Fifth, when the deep freezing compartment mode is in the off state, the deep freezing compartment temperature may be intermittently detected in the certain period to control the operation of the deep freezing compartment fan according to the detected temperature, thereby minimizing that standby power that is consumed by the electrical components provided to maintain the deep freezing compartment temperature.

Sixth, since the main controller and the sub controller for only controlling the deep freezing compartment are separately provided, there may be the advantage that the main controller is shared.

Seventh, when the pause time of the deep freezing compartment fan continues for more than the predetermined time, the deep freezing compartment fan may be driven at the low speed for the predetermined time to prevent the deep freezing compartment fan from being frozen, thereby preventing the phenomenon, in which the deep freezing compartment fan is frozen, from occurring.

MODE FOR CARRYING OUT THE INVENTION

Figure 1:
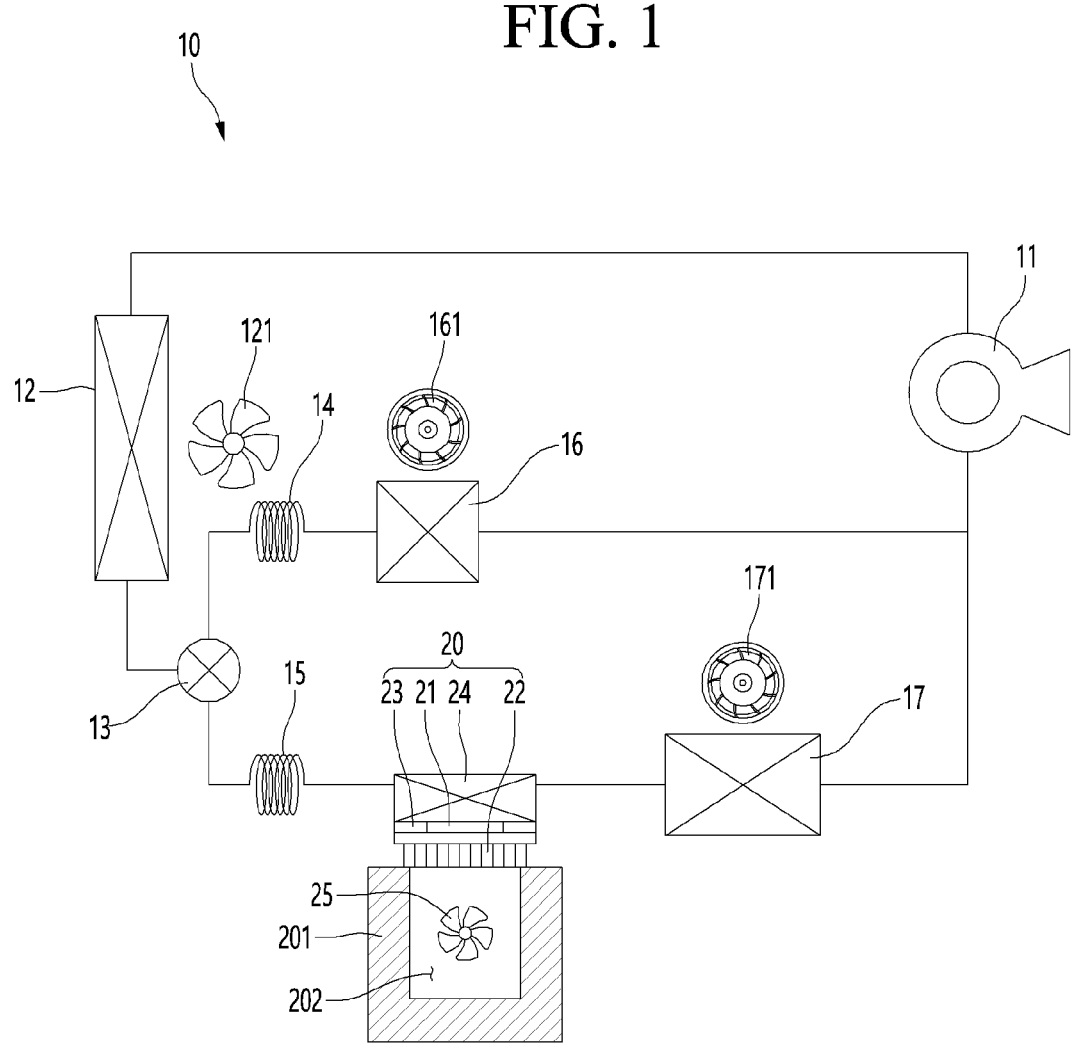
FIG. 1 is a view illustrating a refrigerant circulation system of a refrigerator to which a control method is applied according to an embodiment of the present invention.

Hereinafter, a method for controlling a refrigerator according to an embodiment of the present invention will be described in detail with reference to the accompanying drawings.

In the present invention, a storage compartment that is cooled by a first cooling device and controlled to a predetermined temperature may be defined as a first storage compartment.

In addition, a storage compartment that is cooled by a second cooling device and is controlled to a temperature lower than that of the first storage compartment may be defined as a second storage compartment.

In addition, a storage compartment that is cooled by the third cooling device and is controlled to a temperature lower than that of the second storage compartment may be defined as a third storage compartment.

The first cooling device for cooling the first storage compartment may include at least one of a first evaporator or a first thermoelectric module including a thermoelectric element. The first evaporator may include a refrigerating compartment evaporator to be described later.

The second cooling device for cooling the second storage compartment may include at least one of a second evaporator or a second thermoelectric module including a thermoelectric element. The second evaporator may include a freezing compartment evaporator to be described later.

The third cooling device for cooling the third storage compartment may include at least one of a third evaporator or a third thermoelectric module including a thermoelectric element.

In the embodiments in which the thermoelectric module is used as a cooling means in the present specification, it may be applied by replacing the thermoelectric module with an evaporator, for example, as follows.

(1) "Cold sink of thermoelectric module", "heat absorption surface of thermoelectric module" or "heat absorption side of thermoelectric module" may be interpreted as "evaporator or one side of the evaporator".

(2) "Heat absorption side of thermoelectric module" may be interpreted as the same meaning as "cold sink of thermoelectric module" or "heat absorption side of thermoelectric module".

(3) An electronic controller (processor) "applies or cuts off a constant voltage to the thermoelectric module" may be interpreted as the same meaning as being controlled to "supply or block a refrigerant to the evaporator", "control a switching valve to be opened or closed", or "control a compressor to be turned on or off".

(4) "Controlling the constant voltage applied to the thermoelectric module to increase or decrease" by the controller may be interpreted as the same meaning as "controlling an amount or flow rate of the refrigerant flowing in the evaporator to increase or decrease", "controlling allowing an opening degree of the switching valve to increase or decrease", or "controlling an output of the compressor to increase or decrease".

(5) "Controlling a reverse voltage applied to the thermoelectric module to increase or decrease" by the controller is interpreted as the same meaning as "controlling a voltage applied to the defrost heater adjacent to the evaporator to increase or decrease".

In the present specification, "storage compartment cooled by the thermoelectric module" is defined as a storage compartment A, and "fan located adjacent to the thermoelectric module so that air inside the storage compartment A is heat-exchanged with the heat absorption surface of the thermoelectric module" may be defined as "storage compartment fan A".

Also, a storage compartment cooled by the cooling device while constituting the refrigerator together with the storage compartment A may be defined as "storage compartment B".

In addition, a "cooling device compartment" may be defined as a space in which the cooling device is disposed, in a structure in which the fan for blowing cool air generated by the cooling device is added, the cooling device compartment may be defined as including a space in which the fan is accommodated, and in a structure in which a passage for guiding the cold air blown by the fan to the storage compartment or a passage through which defrost water is discharged is added may be defined as including the passages.

In addition, a defrost heater disposed at one side of the cold sink to remove frost or ice generated on or around the cold sink may be defined as a cold sink defrost heater.

In addition, a defrost heater disposed at one side of the heat sink to remove frost or ice generated on or around the heat sink may be defined as a heat sink defrost heater.

In addition, a defrost heater disposed at one side of the cooling device to remove frost or ice generated on or around the cooling device may be defined as a cooling device defrost heater.

In addition, a defrost heater disposed at one side of a wall surface forming the cooling device chamber to remove frost or ice generated on or around the wall surface forming the cooling device chamber may be defined as a cooling device chamber defrost heater.

In addition, a heater disposed at one side of the cold sink may be defined as a cold sink drain heater in order to minimize refreezing or re-implantation in the process of discharging defrost water or water vapor melted in or around the cold sink.

In addition, a heater disposed at one side of the heat sink may be defined as a heat sink drain heater in order to minimize refreezing or re-implantation in the process of discharging defrost water or water vapor melted in or around the heat sink.

In addition, a heater disposed at one side of the cooling device may be defined as a cooling device drain heater in order to minimize refreezing or re-implantation in the process of discharging defrost water or water vapor melted in or around the cooling device.

In addition, in the process of discharging the defrost water or water vapor melted from or around the wall forming the cooling device chamber, a heater disposed at one side of the wall forming the cooling device chamber may be defined as a cooling device chamber drain heater in order to minimize refreezing or re-implantation.

Also, a "cold sink heater" to be described below may be defined as a heater that performs at least one of a function of the cold sink defrost heater or a function of the cold sink drain heater.

In addition, the "heat sink heater" may be defined as a heater that performs at least one of a function of the heat sink defrost heater or a function of the heat sink drain heater.

In addition, the "cooling device heater" may be defined as a heater that performs at least one of a function of the cooling device defrost heater or a function of the cooling device drain heater.

In addition, a "back heater" to be described below may be defined as a heater that performs at least one of a function of the heat sink heater or a function of the cooling device chamber defrost heater. That is, the back heater may be defined as a heater that performs at least one function among the functions of the heat sink defrost heater, the heater sink drain heater, and the cooling device chamber defrost heater.

In the present invention, as an example, the first storage compartment may include a refrigerating compartment that is capable of being controlled to a zero temperature by the first cooling device.

In addition, the second storage compartment may include a freezing compartment that is capable of being controlled to a temperature below zero by the second cooling device.

In addition, the third storage compartment may include a deep freezing compartment that is capable of being maintained at a cryogenic temperature or an ultrafrezing temperature by the third cooling device.

In the present invention, a case in which all of the third to third storage compartments are controlled to a temperature below zero, a case in which all of the first to third storage compartments are controlled to a zero temperature, and a case in which the first and second storage compartments are controlled to the zero temperature, and the third storage compartment is controlled to the temperature below zero are not excluded.

In the present invention, an "operation" of the refrigerator may be defined as including four processes such as a process (I) of determining whether an operation start condition or an operation input condition is satisfied, a process (II) of performing a predetermined operation when the operation input condition is satisfied, a process (III) of determining whether an operation completion condition is satisfied, and a process (IV) of terminating the operation when the operation completion condition is satisfied.

In the present invention, an "operation" for cooling the storage compartment of the refrigerator may be defined by being divided into a normal operation and a special operation.

The general operation may be referred to as a cooling operation performed when an internal temperature of the refrigerator naturally increases in a state in which the storage compartment door is not opened, or a load input condition due to food storage does not occur.

In detail, when the temperature of the storage compartment enters an unsatisfactory temperature region (described below in detail with reference to the drawings), and the operation input condition is satisfied, the controller controls the cold air to be supplied from the cooling device of the storage compartment so as to cool the storage compartment.

Specifically, the normal operation may include a refrigerating compartment cooling operation, a freezing compartment cooling operation, a deep freezing compartment cooling operation, and the like.

On the other hand, the special operation may mean an operation other than the operations defined as the normal operation.

In detail, the special operation may include a defrost operation controlled to supply heat to the cooling device so as to melt the frost or ice deposited on the cooling device after a defrost period of the storage compartment elapses.

In addition, the special operation may further include a load correspondence operation for controlling the cold air to be supplied from the cooling device to the storage compartment so as to remove a heat load penetrated into the storage compartment when a set time elapses from a time when a door of the storage compartment is opened and closed, or when a temperature of the storage compartment rises to a set temperature before the set time elapses.

In detail, the load correspondence operation includes a door load correspondence operation performed to remove a load penetrated into the storage compartment after opening and closing of the storage compartment door, and an initial cold start operation performed to remove a load correspondence operation performed to remove a load inside the storage compartment when power is first applied after installing the refrigerator.

For example, the defrost operation may include at least one of a refrigerating compartment defrost operation, a freezing compartment defrost operation, and a deep freezing compartment defrost operation.

Also, the door load correspondence operation may include at least one of a refrigerating compartment door load correspondence operation, a freezing compartment door load correspondence operation, and a deep freezing compartment load correspondence operation.

Here, the deep freezing compartment load correspondence operation may be interpreted as an operation for removing the deep freezing compartment load, which is performed when at least one condition for the deep freezing compartment door load correspondence input condition performed when the load increases due to the opening of the door of the deep freezing compartment, the initial cold start operation input condition preformed to remove the load within the deep freezing compartment when the deep freezing compartment is switched from an on state to an off state, or the operation input condition after the defrosting that initially stats after the deep freezing compartment defrost operation is completed.

In detail, determining whether the operation input condition corresponding to the load of the deep freezing compartment door is satisfied may include determining whether at least one of a condition in which a predetermined amount of time elapses from at time point at which at least one of the freezing compartment door and the deep freezing compartment door is closed after being opened, or a condition in which a temperature of the deep freezing compartment rises to a set temperature within a predetermined time is satisfied.

In addition, determining whether the initial cold start operation input condition for the deep freezing compartment is satisfied may include determining whether the refrigerator is powered on, and the deep freezing compartment mode is switched from the off state to the on state.

In addition, determining whether the operation input condition is satisfied after the deep freezing compartment defrost may include determining at least one of stopping of the reverse voltage applied to the thermoelectric module for cold sink heater off, back heater off, cold sink defrost, stopping of the constant voltage applied to the thermoelectric module for the heat sink defrost after the reverse voltage is applied for the cold sink defrost, an increase of a temperature of a housing accommodating the heat sink to a set temperature, or terminating of the freezing compartment defrost operation.

Thus, the operation of the storage compartment including at least one of the refrigerating compartment, the freezing compartment, or the deep freezing compartment may be summarized as including the normal storage compartment operation and the storage compartment special operation.

When two operations conflict with each other during the operation of the storage compartment described above, the controller may control one operation (operation A) to be performed preferentially and the other operation (operation B) to be paused.

In the present invention, the conflict of the operations may include i) a case in which an input condition for the operation A and an input condition for the operation B are satisfied at the same time to conflict with each other, a case in which the input condition for the operation B is satisfied while the input condition for the operation A is satisfied to perform the operation A to conflict with each other, and a case in which the input condition for operation A is satisfied while the input condition for the operation B is satisfied to perform the operation B to conflict with each other.

When the two operations conflict with each other, the controller determines the performance priority of the conflicting operations to perform a so-called "conflict control algorithm" to be executed in order to control the performance of the correspondence operation.

A case in which the operation A is performed first, and the operation B is stopped will be described as an example.

In detail, in the present invention, the paused operation B may be controlled to follow at least one of the three cases of the following example after the completion of the operation A.

a. Termination of operation B

When the operation A is completed, the performance of the operation B may be released to terminate the conflict control algorithm and return to the previous operation process.

Here, the "release" does not determine whether the paused operation B is not performed any more, and whether the input condition for the operation B is satisfied. That is, it is seen that the determination information on the input condition for the operation B is initialized.

b. Redetermination of input condition of operation B

When the firstly performed operation A is completed, the controller may return to the process of determining again whether the input condition for the paused operation B is satisfied, and determine whether the operation B restarts.

For example, if the operation B is an operation in which the fan is driven for 10 minutes, and the operation is stopped when 3 minutes elapses after the start of the operation due to the conflict with the operation A, it is determined again whether the input condition for the operation B is satisfied at a time point at which the operation A is completed, and if it is determined to be satisfied, the fan is driven again for 10 minutes.

c. Continuation of operation B

When the firstly performed operation A is completed, the controller may allow the paused operation B to be continued. Here, "continuation" means not to start over from the beginning, but to continue the paused operation.

For example, if the operation B is an operation in which the fan is driven for 10 minutes, and the operation is paused after 3 minutes elapses after the start of the operation due to the conflict with operation A, the compressor is further driven for the remaining time of 7 minutes immediately after the operation A is completed.

In the present invention, the priority of the operations may be determined as follows.

First, when the normal operation and the special operation conflict with each other, it is possible to control the special operation to be performed preferentially.

Second, when the conflict between the normal operations occurs, the priority of the operations may be determined as follows.

I. When the refrigerating compartment cooling operation and the freezing compartment cooling operation conflict with each other, the refrigerating compartment cooling operation may be performed preferentially.

II. When the refrigerating compartment (or freezing compartment) cooling operation and the deep freezing compartment cooling operation conflict with each other, the refrigerating compartment (or freezing compartment) cooling operation may be performed preferentially. Here, in order to prevent the deep freezing compartment temperature from rising excessively, cooling capacity having a level lower than that of maximum cooling capacity of the deep freezing compartment cooling device may be supplied from the deep freezing compartment cooling device to the deep freezing compartment.

The cooling capacity may mean at least one of cooling capacity of the cooling device itself and an airflow amount of the cooling fan disposed adjacent to the cooling device. For example, when the cooling device of the deep freezing compartment is the thermoelectric module, the controller may perform the refrigerating compartment (or freezing compartment) cooling operation with priority when the refrigerating compartment (or freezing compartment) cooling operation and the deep freezing compartment cooling operation conflict with each other. Here, a voltage lower than a maximum voltage that is capable of being applied to the thermoelectric module may be input into the thermoelectric module.

Third, when the conflict between special operations occurs, the priority of the operations may be determined as follows.

I. When a refrigerating compartment door load correspondence operation conflicts with a freezing compartment door load correspondence operation, the controller may control the refrigerating compartment door load correspondence operation to be performed with priority.

II. When the freezing compartment door load correspondence operation conflicts with the deep freezing compartment door load correspondence operation, the controller may control the deep freezing compartment door load correspondence operation to be performed with priority.

III. If the refrigerating compartment operation and the deep freezing compartment door load correspondence operation conflict with each other, the controller may control the refrigerating compartment operation and the deep freezing compartment door load correspondence operation so as to be performed at the same time. Then, when the temperature of the refrigerating compartment reaches a specific temperature a, the controller may control the deep freezing compartment door load correspondence operation so as to be performed exclusively. When the refrigerating compartment temperature rises again to reach a specific temperature b (a<b) while the deep freezing compartment door load correspondence operation is performed independently, the controller may control the refrigerating compartment operation and the deep freezing compartment door load correspondence operation so as to be performed at the same time. Thereafter, an operation switching process between the simultaneous operation of the deep freezing compartment and the refrigerating compartment and the exclusive operation of the deep freezing compartment may be controlled to be repeatedly performed according to the temperature of the refrigerating compartment.

As an extended modified example, when the operation input condition for the deep freezing compartment load correspondence operation is satisfied, the controller may control the operation to be performed in the same manner as when the refrigerating compartment operation and the deep freezing compartment door load correspondence operation conflict with each other.

Hereinafter, as an example, the description is limited to the case in which the first storage compartment is the refrigerating compartment, the second storage compartment is the freezing compartment, and the third storage compartment is the deep freezing compartment.

FIG. 1 is a view illustrating a refrigerant circulation system of a refrigerator according to an embodiment of the present invention.

Referring to FIG. 1, a refrigerant circulation system according to an embodiment of the present invention includes a compressor 11 that compresses a refrigerant into a high-temperature and high-pressure gaseous refrigerant, a condenser 12 that condenses the refrigerant discharged from the compressor 11 into a high-temperature and high-pressure liquid refrigerant, an expansion valve that expands the refrigerant discharged from the condenser 12 into a low-temperature and low-pressure two-phase refrigerant, and an evaporator that evaporates the refrigerant passing through the expansion valve into a low-temperature and low-pressure gaseous refrigerant. The refrigerant discharged from the evaporator flows into the compressor 11. The above components are connected to each other by a refrigerant pipe to constitute a closed circuit.

In detail, the expansion valve may include a refrigerating compartment expansion valve 14 and a freezing compartment expansion valve 15. The refrigerant pipe is divided into two branches at an outlet side of the condenser 12, and the refrigerating compartment expansion valve 14 and the freezing compartment expansion valve 15 are respectively connected to the refrigerant pipe that is divided into the two branches. That is, the refrigerating compartment expansion valve 14 and the freezing compartment expansion valve 15 are connected in parallel at the outlet of the condenser 12.

A switching valve 13 is mounted at a point at which the refrigerant pipe is divided into the two branches at the outlet side of the condenser 12. The refrigerant passing through the condenser 12 may flow through only one of the refrigerating compartment expansion valve 14 and the freezing compartment expansion valve 15 by an operation of adjusting an opening degree of the switching valve 13 or may flow to be divided into both sides.

The switching valve 13 may be a three-way valve, and a flow direction of the refrigerant is determined according to an operation mode. Here, one switching valve such as the three-way valve may be mounted at an outlet of the condenser to control the flow direction of the refrigerant, or alternatively, the switching valves are mounted at inlet sides of a refrigerating compartment expansion valve 14 and a freezing compartment expansion valve 15, respectively.

As a first example of an evaporator arrangement manner, the evaporator may include a refrigerating compartment evaporator 16 connected to an outlet side of the refrigerating compartment expansion valve 14 and a heat sink and a freezing compartment evaporator 17, which are connected in series to an outlet side of the freezing compartment expansion valve 15. The heat sink 24 and the freezing compartment evaporator 17 are connected in series, and the refrigerant passing through the freezing compartment expansion valve passes through the heat sink 24 and then flows into the freezing compartment evaporator 17.

As a second example, the heat sink 24 may be disposed at an outlet side of the freezing compartment evaporator 17 so that the refrigerant passing through the freezing compartment evaporator 17 flows into the heat sink 24.

As a third example, a structure in which the heat sink 24 and the freezing compartment evaporator 17 are connected in parallel at an outlet end of the freezing compartment expansion valve 15 is not excluded.

Although the heat sink 24 is the evaporator, it is provided for the purpose of cooling a heat generation surface of the thermoelectric module to be described later, not for the purpose of heat-exchange with the cold air of the deep freezing compartment.

In each of the three examples described above with respect to the arrangement manner of the evaporator, a complex system of a first refrigerant circulation system, in which the switching valve 13, the refrigerating compartment expansion valve 14, and the refrigerating compartment evaporator 16 are removed, and a second refrigerant circulation system constituted by the refrigerating compartment cooling evaporator, the refrigerating compartment cooling expansion valve, the refrigerating compartment cooling condenser, and a refrigerating compartment cooling compressor is also possible. Here, the condenser constituting the first refrigerant circulation system and the condenser constituting the second refrigerant circulation system may be independently provided, and a complex condenser which is provided as a single body and in which the refrigerant is not mixed may be provided.

The refrigerant circulation system of the refrigerator having the two storage compartments including the deep freezing compartment may be configured only with the first refrigerant circulation system.

Hereinafter, as an example, the description will be limited to a structure in which the heat sink and the freezing compartment evaporator 17 are connected in series.

A condensing fan 121 is mounted adjacent to the condenser 12, a refrigerating compartment fan 161 is mounted adjacent to the refrigerating compartment evaporator 16, and a freezing compartment fan 171 is mounted adjacent to the freezing compartment evaporator 17.

A refrigerating compartment maintained at a refrigerating temperature by cold air generated by the refrigerating compartment evaporator 16, a freezing compartment maintained at a freezing temperature by cold air generated by the freezing compartment evaporator 16, and a deep freezing compartment 202 maintained at a cryogenic or ultrafrezing temperature by a thermoelectric module to be described later are formed inside the refrigerator provided with the refrigerant circulation system according to the embodiment of the present invention. The refrigerating compartment and the freezing compartment may be disposed adjacent to each other in a vertical direction or horizontal direction and are partitioned from each other by a partition wall. The deep freezing compartment may be provided at one side of the inside of the freezing compartment, but the present invention includes the deep freezing compartment provided at one side of the outside of the freezing compartment. In order to block the heat exchange between the cold air of the deep freezing compartment and the cold air of the freezing compartment, the deep freezing compartment 202 may be partitioned from the freezing compartment by a deep freezing case 201 having the high thermal insulation performance.

In addition, the thermoelectric module includes a thermoelectric element 21 having one side through which heat is absorbed and the other side through which heat is released when power is supplied, a cold sink 22 mounted on the heat absorption surface of the thermoelectric element 21, a heat sink mounted on the heat generation surface of the thermoelectric element 21, and an insulator 23 that blocks heat exchange between the cold sink 22 and the heat sink.

Here, the heat sink 24 is an evaporator that is in contact with the heat generation surface of the thermoelectric element 21. That is, the heat transferred to the heat generation surface of the thermoelectric element 21 is heat-exchanged with the refrigerant flowing inside the heat sink 24. The refrigerant flowing along the inside of the heat sink 24 and absorbing heat from the heat generation surface of the thermoelectric element 21 is introduced into the freezing compartment evaporator 17.

In addition, a cooling fan may be provided in front of the cold sink 22, and the cooling fan may be defined as the deep freezing compartment fan 25 because the fan is disposed behind the inside of the deep freezing compartment.

The cold sink 22 is disposed behind the inside of the deep freezing compartment 202 and configured to be exposed to the cold air of the deep freezing compartment 202. Thus, when the deep freezing compartment fan 25 is driven to forcibly circulate cold air in the deep freezing compartment 202, the cold sink 22 absorbs heat through heat-exchange with the cold air in the deep freezing compartment and then is transferred to the heat absorption surface of the thermoelectric element 21. The heat transferred to the heat absorption surface is transferred to the heat generation surface of the thermoelectric element 21.

The heat sink 24 functions to absorb the heat absorbed from the heat absorption surface of the thermoelectric element 21 and transferred to the heat generation surface of the thermoelectric element 21 again to release the heat to the outside of the thermoelectric module 20.

Figure 2:
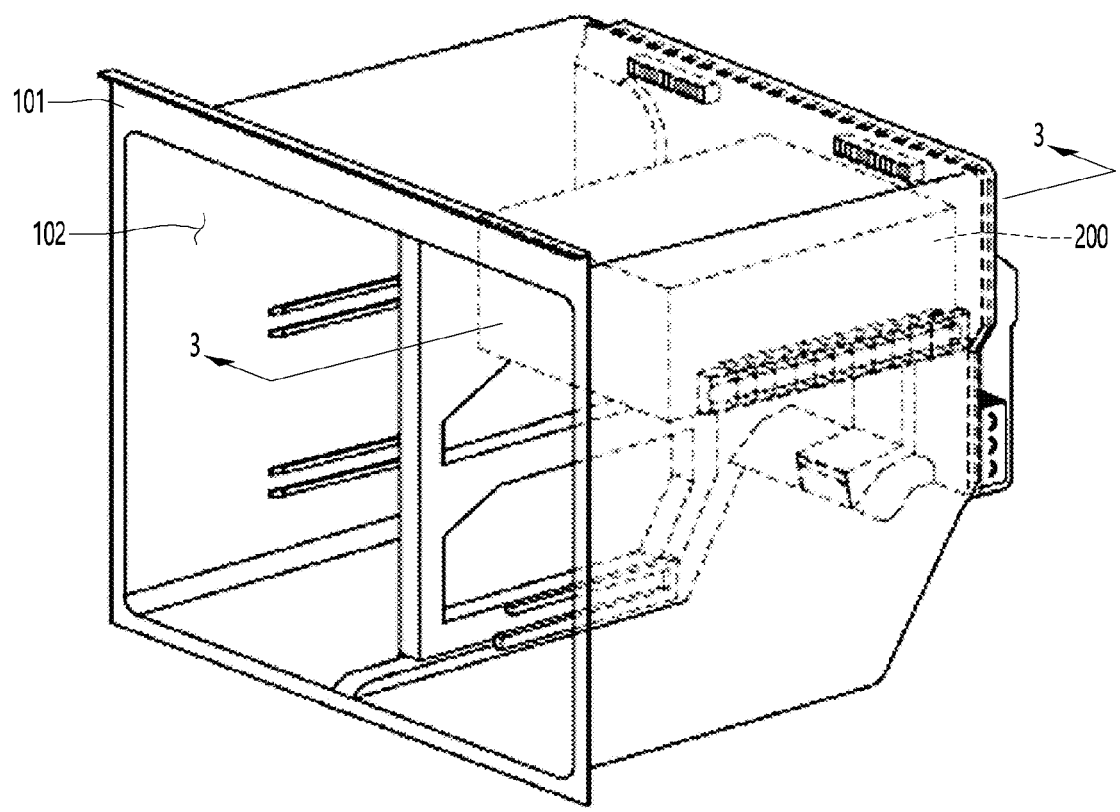
FIG. 2 is a perspective view illustrating structures of a freezing compartment and a deep freezing compartment of the refrigerator according to an embodiment of the present invention.
Figure 3:
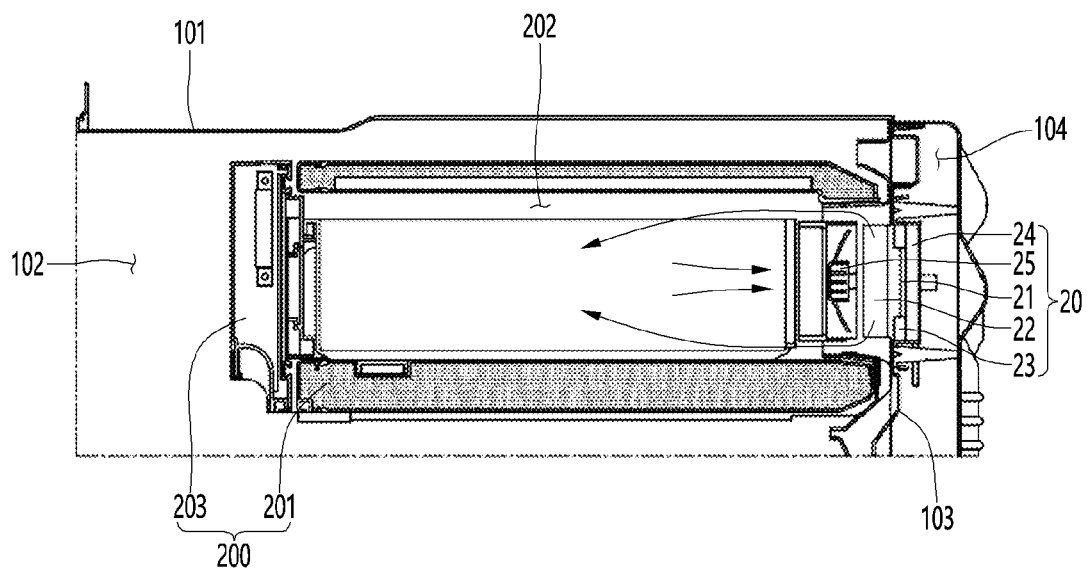
FIG. 3 is a longitudinal cross-sectional view taken along line 3-3 of FIG. 2.

FIG. 2 is a perspective view illustrating structures of the freezing compartment and the deep freezing compartment of the refrigerator according to an embodiment of the present invention, and FIG. 3 is a longitudinal cross-sectional view taken along line 3-3 of FIG. 2.

Referring to FIGS. 2 and 3, the refrigerator according to an embodiment of the present invention includes an inner case 101 defining the freezing compartment 102 and a deep freezing unit 200 mounted at one side of the inside of the freezing compartment 102.

In detail, the inside of the refrigerating compartment is maintained to a temperature of about 3° C., and the inside of the freezing compartment 102 is maintained to a temperature of about −18° C., whereas a temperature inside the deep freezing unit 200, i.e., an internal temperature of the deep freezing compartment 202 has to be maintained to about −50° C. Therefore, in order to maintain the internal temperature of the deep freezing compartment 202 at a cryogenic temperature of −50° C., an additional freezing means such as the thermoelectric module 20 is required in addition to the freezing compartment evaporator.

In more detail, the deep freezing unit 200 includes a deep freezing case 201 that forms a deep freezing compartment 202 therein, a deep freezing compartment drawer 203 slidably inserted into the deep freezing case 201, and a thermoelectric module 20 mounted on a rear surface of the deep freezing case 201.

Instead of applying the deep freezing compartment drawer 203, a structure in which a deep freezing compartment door is connected to one side of the front side of the deep freezing case 201, and the entire inside of the deep freezing compartment 201 is configured as a food storage space is also possible.

In addition, the rear surface of the inner case 101 is stepped backward to form a freezing evaporation compartment 104 in which the freezing compartment evaporator 17 is accommodated. In addition, an inner space of the inner case 101 is divided into the freezing evaporation compartment 104 and the freezing compartment 102 by the partition wall 103. The thermoelectric module 20 is fixedly mounted on a front surface of the partition wall 103, and a portion of the thermoelectric module 20 passes through the deep freezing case 201 and is accommodated in the deep freezing compartment 202.

In detail, the heat sink 24 constituting the thermoelectric module 20 may be an evaporator connected to the freezing compartment expansion valve 15 as described above. A space in which the heat sink 24 is accommodated may be formed in the partition wall 103.

Since the two-phase refrigerant cooled to a temperature of about −18° C. to −20° C. while passing through the freezing compartment expansion valve 15 flows inside the heat sink 24, a surface temperature of the heat sink 24 may be maintained to a temperature of −18° C. to −20° C. Here, it is noted that a temperature and pressure of the refrigerant passing through the freezing compartment expansion valve 15 may vary depending on the freezing compartment temperature condition.

When a rear surface of the thermoelectric element 21 is in contact with a front surface of the heat sink 24, and power is applied to the thermoelectric element 21, the rear surface of the thermoelectric element 21 becomes a heat generation surface.

When the cold sink 22 is in contact with a front surface of the thermoelectric element, and power is applied to the thermoelectric element 21, the front surface of the thermoelectric element 21 becomes a heat absorption surface.

The cold sink 22 may include a heat conduction plate made of an aluminum material and a plurality of heat exchange fins extending from a front surface of the heat conduction plate. Here, the plurality of heat exchange fins extend vertically and are disposed to be spaced apart from each other in a horizontal direction.

Here, when a housing surrounding or accommodating at least a portion of a heat conductor constituted by the heat conduction plate and the heat exchange fin is provided, the cold sink 22 has to be interpreted as a heat transfer member including the housing as well as the heat conductor. This is equally applied to the heat sink 22, and the heat sink 22 has be interpreted not only as the heat conductor constituted by the heat conduction plate and the heat exchange fin, but also as the heat transfer member including the housing when a housing is provided.

The deep freezing compartment fan 25 is disposed in front of the cold sink 22 to forcibly circulate air inside the deep freezing compartment 202.

Hereinafter, efficiency and cooling capacity of the thermoelectric element will be described.

The efficiency of the thermoelectric module 20 may be defined as a coefficient of performance (COP), and an efficiency equation is as follows.

$$COP = \frac{Q_c}{P_e}$$

Qc: Cooling Capacity (ability to absorb heat)
Pe: Input Power (power supplied to thermoelectric element)

$$P_e = V \times i$$

In addition, the cooling capacity of the thermoelectric module 20 may be defined as follows.

$$Q_c = \alpha T_c i - \frac{1}{2}\frac{\rho L}{A}i^2 - \frac{kA}{L}(T_h - T_c)$$

<Semiconductor Material Property Coefficient>
α: Seebeck Coefficient [V/K]
ρ: Specific Resistance [Ωm−1]
k: Thermal conductivity [Ωm−1]
<Semiconductor Structure Characteristics>
L: Thickness of thermoelectric element: Distance between heat absorption surface and heat generation surface
A: Area of thermoelectric element
<System Use Condition>
i: Current
V: Voltage
Th: Temperature of heat generation surface of thermoelectric element
Tc: Temperature of heat absorption surface of thermoelectric module In the above cooling capacity equation, a first item at the right may be defined as a Peltier Effect and may be defined as an amount of heat transferred between both ends of the heat absorption surface and the heat generation surface by a voltage difference. The Peltier effect increases in proportional to supply current as a function of current.

In the formula V=iR, since a semiconductor constituting the thermoelectric module acts as resistance, and the resistance may be regarded as a constant, it may be said that a voltage and current have a proportional relationship. That is, when the voltage applied to the thermoelectric module 21 increases, the current also increases. Accordingly, the Peltier effect may be seen as a current function or as a voltage function.

The cooling capacity may also be seen as a current function or a voltage function. The Peltier effect acts as a positive effect of increasing in cooling capacity. That is, as the supply voltage increases, the Peltier effect increases to increase in cooling capacity.

The second item in the cooling capacity equation is defined as a Joule Effect.

The Joule effect means an effect in which heat is generated when current is applied to a resistor. In other words, since heat is generated when power is supplied to the thermoelectric module, this acts as a negative effect of reducing the cooling capacity. Therefore, when the voltage supplied to the thermoelectric module increases, the Joule effect increases, resulting in lowering of the cooling capacity of the thermoelectric module.

The third item in the cooling capacity equation is defined as a Fourier effect.

The Fourier effect means an effect in which heat is transferred by heat conduction when a temperature difference occurs on both surfaces of the thermoelectric module.

In detail, the thermoelectric module includes a heat absorption surface and a heat generation surface, each of which is provided as a ceramic substrate, and a semiconductor disposed between the heat absorption surface and the heat generation surface. When a voltage is applied to the thermoelectric module, a temperature difference is generated between the heat absorption surface and the heat generation surface. The heat absorbed through the heat absorption surface passes through the semiconductor and is transferred to the heat generation surface. However, when the temperature difference between the heat absorption surface and the heat absorption surface occurs, a phenomenon in which heat flows backward from the heat generation surface to the heat absorption surface by heat conduction occurs, which is referred to as the Fourier effect.

Like the Joule effect, the Fourier effect acts as a negative effect of lowering the cooling capacity. In other words, when the supply current increases, the temperature difference (Th-Tc) between the heat generation surface and the heat absorption surface of the thermoelectric module, i.e., a value ΔT, increases, resulting in lowering of the cooling capacity.

Figure 4:
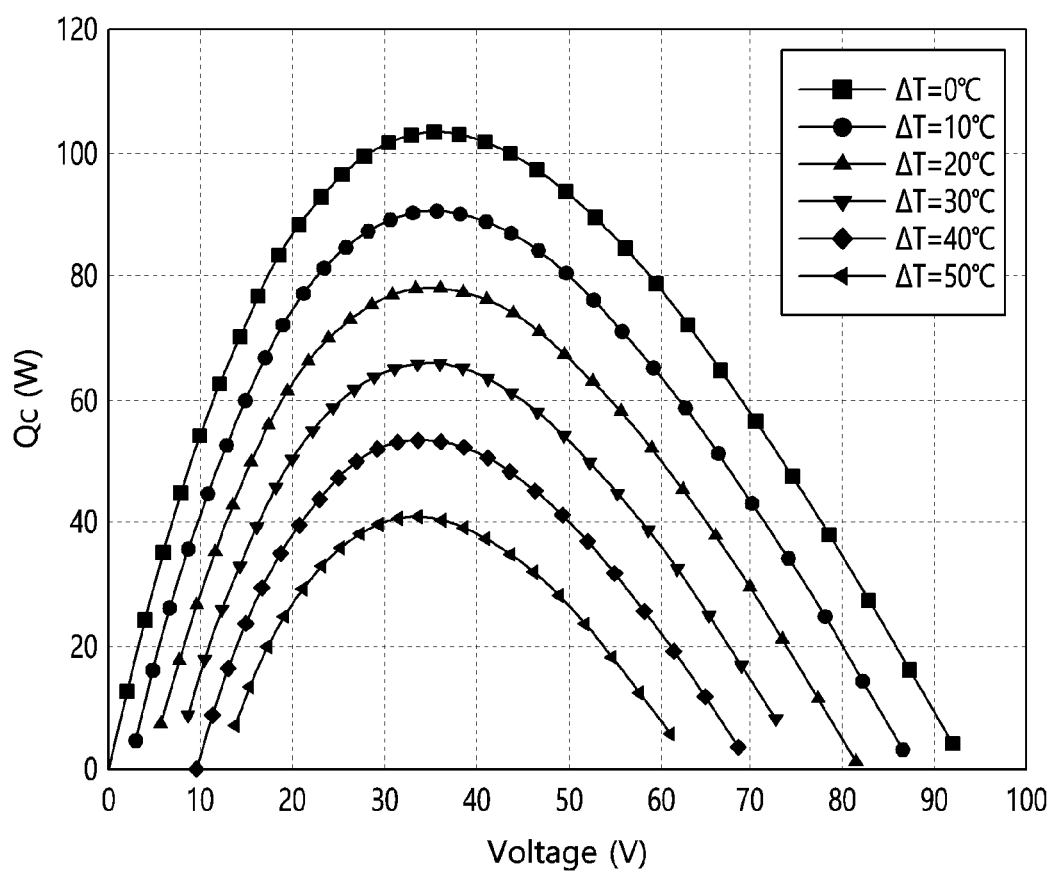
FIG. 4 is a graph illustrating a relationship of cooling capacity with respect to an input voltage and a Fourier effect.

FIG. 4 is a graph illustrating a relationship of cooling capacity with respect to the input voltage and the Fourier effect.

Referring to FIG. 4, the Fourier effect may be defined as a function of the temperature difference between the heat absorption surface and the heat generation surface, that is, a value ΔT.

In detail, when specifications of the thermoelectric module are determined, values k, A, and L in the item of the Fourier effect in the above cooling capacity equation become constant values, and thus, the Fourier effect may be seen as a function with the value ΔT as a variable.

Therefore, as the value ΔT increases, the value of the Fourier effect increases, but the Fourier effect acts as a negative effect on the cooling capacity, and thus the cooling capacity decreases.

As shown in the graph of FIG. 4, it is seen that the greater the value ΔT under the constant voltage condition, the less the cooling capacity.

In addition, when the value ΔT is fixed, for example, when ΔT is 30° C., a change in cooling capacity according to a change of the voltage is observed. As the voltage value increases, the cooling capacity increases and has a maximum value at a certain point and then decreases again.

Here, since the voltage and current have a proportional relationship, it should be noted that it is no matter to view the current described in the cooling capacity equation as the voltage and be interpreted in the same manner.

In detail, the cooling capacity increases as the supply voltage (or current) increases, which may be explained by the above cooling capacity equation. First, since the value ΔT is fixed, the value ΔT becomes a constant. Since the ΔT value for each standard of the thermoelectric module is determined, an appropriate standard of the thermoelectric module may be set according to the required value ΔT.

Since the value ΔT is fixed, the Fourier effect may be seen as a constant, and the cooling capacity may be simplified into a function of the Peltier effect, which is seen as a first-order function of the voltage (or current), and the Joule effect, which is seen as a second-order function of the voltage (or current).

As the voltage value gradually increases, an amount of increase in Peltier effect, which is the first-order function of the voltage, is larger than that of increase in Joule effect, which is the second-order function, of voltage, and consequently, the cooling capacity increases. In other words, until the cooling capacity is maximized, the function of the Joule effect is close to a constant, so that the cooling capacity approaches the first-order function of the voltage.

As the voltage further increases, it is seen that a reversal phenomenon, in which a self-heat generation amount due to the Joule effect is greater than a transfer heat amount due to the Peltier effect, occurs, and as a result, the cooling capacity decreases again. This may be more clearly understood from the functional relationship between the Peltier effect, which is the first-order function of the voltage (or current), and the Joule effect, which is the second-order function of the voltage (or current). That is, when the cooling capacity decreases, the cooling capacity is close to the second-order function of the voltage.

In the graph of FIG. 4, it is confirmed that the cooling capacity is maximum when the supply voltage is in a range of about 30 V to about 40 V, more specifically, about 35 V. Therefore, if only the cooling capacity is considered, it is said that it is preferable to generate a voltage difference within a range of 30 V to 40V in the thermoelectric module.

Figure 5:
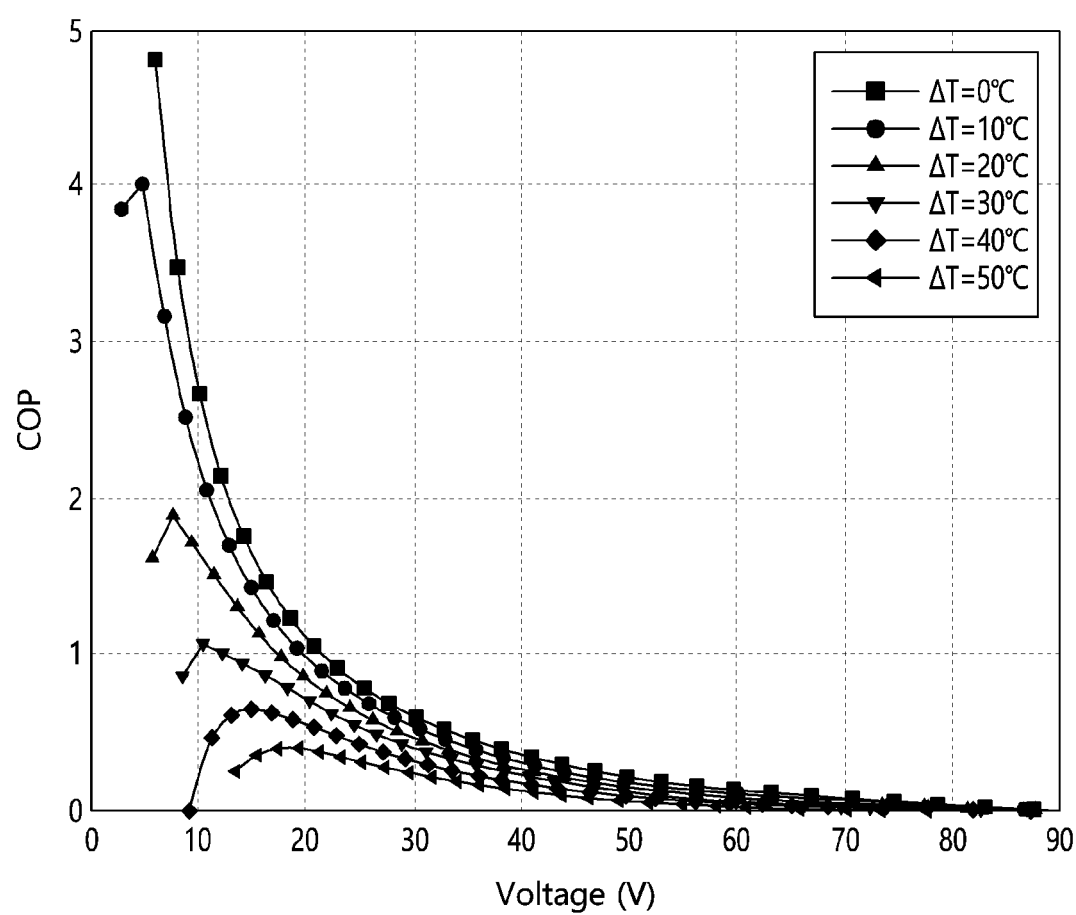
FIG. 5 is a graph illustrating a relationship of efficiency with respect to an input voltage and a Fourier effect.

FIG. 5 is a graph illustrating a relationship of efficiency with respect to the input voltage and the Fourier effect.

Referring to FIG. 5, it is seen that the higher the value ΔT, the lower the efficiency at the same voltage. This will be noted as a natural result because the efficiency is proportional to the cooling capacity.

In addition, when the value ΔT is fixed, for example, when the value ΔT is limited to 30° C. and the change in efficiency according to the change in voltage is observed, the efficiency increases as the supply voltage increases, and the efficiency decreases after a certain time point elapses. This is said to be similar to the graph of the cooling capacity according to the change of the voltage.

Here, the efficiency (COP) is a function of input power as well as cooling capacity, and the input Pe becomes a function of $V^2$ when the resistance of the thermoelectric module 21 is considered as the constant. If the cooling capacity is divided by $V^2$, the efficiency may be expressed as Peltier effect−Peltier effect/$V^2$. Therefore, it is seen that the graph of the efficiency has a shape as illustrated in FIG. 5.

It is seen from the graph of FIG. 5, in which a point at which the efficiency is maximum appears in a region in which the voltage difference (or supply voltage) applied to the thermoelectric module is less than about 20 V. Therefore, when the required value ΔT is determined, it is good to apply an appropriate voltage according to the value to maximize the efficiency. That is, when a temperature of the heat sink and a set temperature of the deep freezing compartment 202 are determined, the value ΔT is determined, and accordingly, an optimal difference of the voltage applied to the thermoelectric module may be determined.

Figure 6:
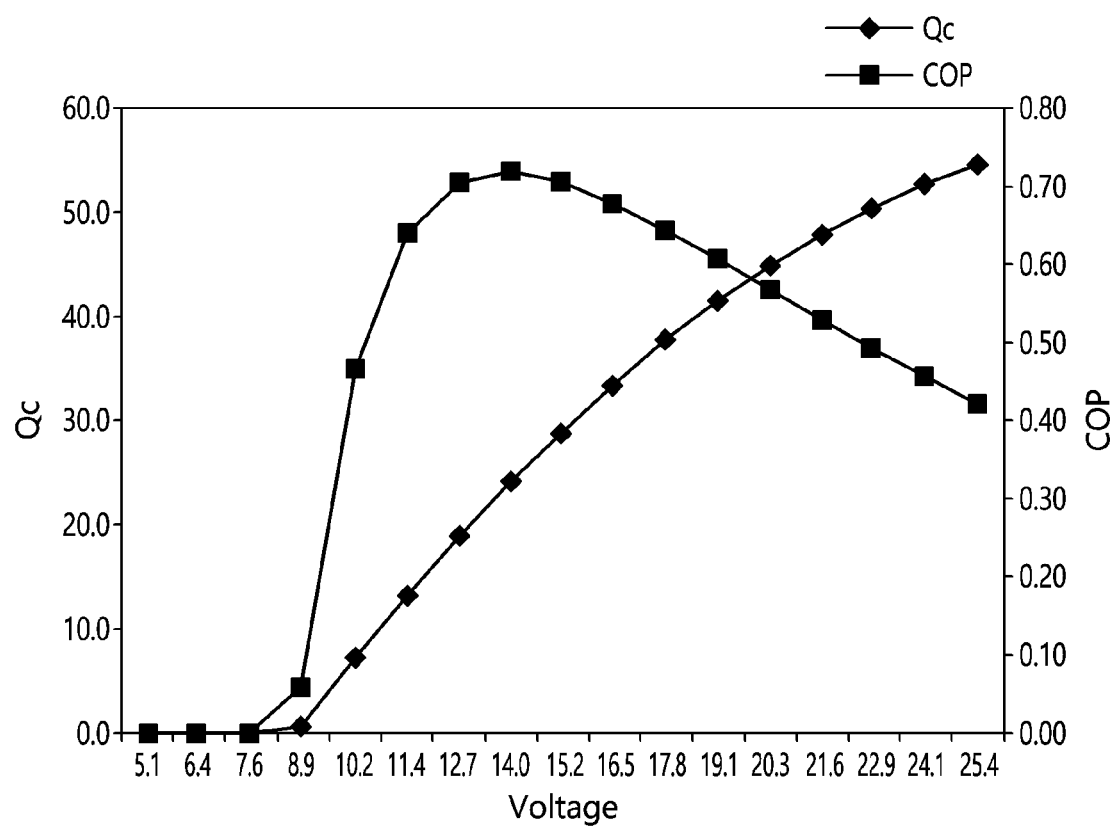
FIG. 6 is a graph illustrating a relationship of cooling capacity and efficiency according to a voltage.

FIG. 6 is a graph illustrating a relationship of the cooling capacity and the efficiency according to a voltage.

Referring to FIG. 6, as described above, as the voltage difference increases, both the cooling capacity and efficiency increase and then decrease.

In detail, it is seen that the voltage value at which the cooling capacity is maximized and the voltage value at which the efficiency is maximized are different from each other. This is seen that the voltage is the first-order function, and the efficiency is the second-order function until the cooling capacity is maximized.

As illustrated in FIG. 6, as an example, in the case of the thermoelectric module having ΔT of 30° C., it is confirmed that the thermoelectric module has the highest efficiency within a range of approximately 12 V to 17 V of the voltage applied to the thermoelectric module. Within the above voltage range, the cooling capacity continues to increase. Therefore, it is seen that a voltage difference of at least 12 V is required in consideration of the cooling capacity, and the efficiency is maximum when the voltage difference is 14 V.

Figure 7:
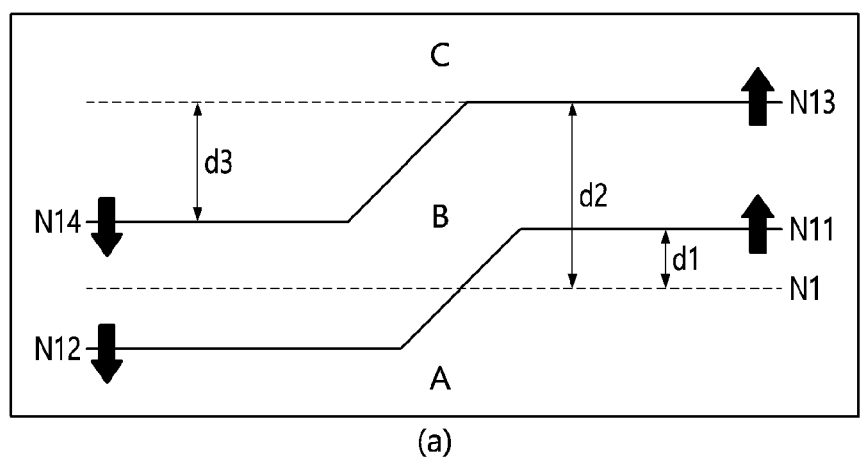
FIG. 7 is a view illustrating a reference temperature line for controlling a refrigerator according to a change in load inside the refrigerator.
Figure 7:
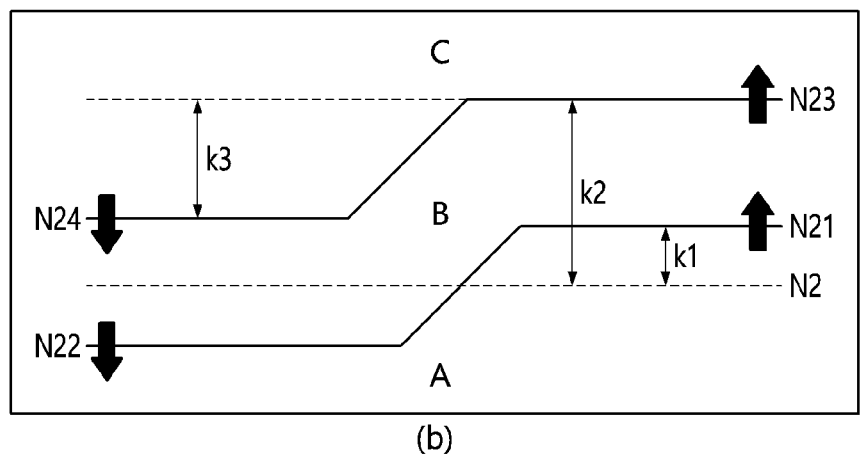
Figure 7:
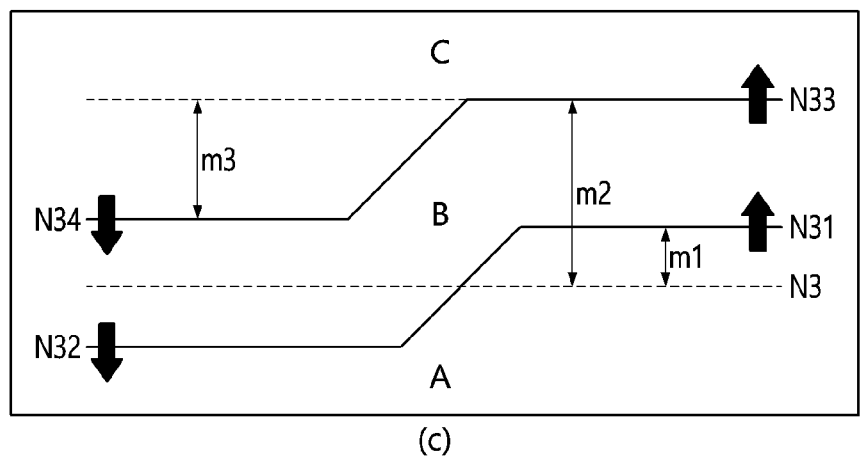

FIG. 7 is a view illustrating a reference temperature line for controlling the refrigerator according to a change in load inside the refrigerator.

Hereinafter, a set temperature of each storage compartment will be described by being defined as a notch temperature. The reference temperature line may be expressed as a critical temperature line.

A lower reference temperature line in the graph is a reference temperature line by which a satisfactory temperature region and a unsatisfactory temperature region are divided. Thus, a region A below the lower reference temperature line may be defined as a satisfactory section or a satisfactory region, and a region B above the lower reference temperature line may be defined as a dissatisfied section or a dissatisfied region.

In addition, an upper reference temperature line is a reference temperature line by which an unsatisfactory temperature region and an upper limit temperature region are divided. Thus, a region C above the upper reference temperature line may be defined as an upper limit region or an upper limit section and may be seen as a special operation region.

When defining the satisfactory/unsatisfactory/upper limit temperature regions for controlling the refrigerator, the lower reference temperature line may be defined as either a case of being included in the satisfactory temperature region or a case of being included in the unsatisfactory temperature region. In addition, the upper reference temperature line may be defined as one of a case of being included in the unsatisfactory temperature region and a case of being included in the upper limit temperature region.

When the internal temperature of the refrigerator is within the satisfactory region A, the compressor is not driven, and when the internal temperature of the refrigerator is in the unsatisfactory region B, the compressor is driven so that the internal temperature of the refrigerator is within the satisfactory region.

In addition, when the internal temperature of the refrigerator is in the upper limit region C, it is considered that food having a high temperature is put into the refrigerator, or the door of the storage compartment is opened to rapidly increase in load within the refrigerator. Thus, a special operation algorithm including a load correspondence operation is performed.

(a) of FIG. 7 is a view illustrating a reference temperature line for controlling the refrigerator according to a change in temperature of the refrigerating compartment.

A notch temperature N1 of the refrigerating compartment is set to a temperature above zero. In order to allow the temperature of the refrigerating compartment to be maintained to the notch temperature N1, when the temperature of the refrigerating compartment rises to a first satisfactory critical temperature N11 higher than the notch temperature N1 by a first temperature difference d1, the compressor is controlled to be driven, and after the compressor is driven, the compressor is controlled to be stopped when the temperature is lowered to a second satisfactory critical temperature N12 lower than the notch temperature N1 by the first temperature difference d1.

The first temperature difference d1 is a temperature value that increases or decreases from the notch temperature N1 of the refrigerating compartment, and the temperature of the refrigerating compartment may be defined as a control differential or a control differential temperature, which defines a temperature section in which the temperature of the refrigerating compartment is considered as being maintained to the notch temperature N1, i.e., approximately 1.5° C.

In addition, when it is determined that the refrigerating compartment temperature rises from the notch temperature N1 to a first unsatisfactory critical temperature N13 which is higher by the second temperature difference d2, the special operation algorithm is controlled to be executed. The second temperature difference d2 may be 4.5° C. The first unsatisfactory critical temperature may be defined as an upper limit input temperature.

After the special driving algorithm is executed, if the internal temperature of the refrigerator is lowered to a second unsatisfactory temperature N14 lower than the first unsatisfactory critical temperature by a third temperature difference d3, the operation of the special driving algorithm is ended. The second unsatisfactory temperature N14 may be lower than the first unsatisfactory temperature N13, and the third temperature difference d3 may be 3.0° C. The second unsatisfactory critical temperature N14 may be defined as an upper limit release temperature.

After the special operation algorithm is completed, the cooling capacity of the compressor is adjusted so that the internal temperature of the refrigerator reaches the second satisfactory critical temperature N12, and then the operation of the compressor is stopped.

(b) of FIG. 7 is a view illustrating a reference temperature line for controlling the refrigerator according to a change in temperature of the freezing compartment.

A reference temperature line for controlling the temperature of the freezing compartment have the same temperature as the reference temperature line for controlling the temperature of the refrigerating compartment, but the notch temperature N2 and temperature variations k1, k2, and k3 increasing or decreasing from the notch temperature N2 are only different from the notch temperature N1 and temperature variations d1, d2, and d3.

The freezing compartment notch temperature N2 may be −18° C. as described above, but is not limited thereto. The control differential temperature k1 defining a temperature section in which the freezing compartment temperature is considered to be maintained to the notch temperature N2 that is the set temperature may be 2° C.

Thus, when the freezing compartment temperature increases to the first satisfactory critical temperature N21, which increases by the first temperature difference k1 from the notch temperature N2, the compressor is driven, and when the freezing compartment temperature is the unsatisfactory critical temperature (upper limit input temperature) N23, which increases by the second temperature difference k2 than the notch temperature N2, the special operation algorithm is performed.

In addition, when the freezing compartment temperature is lowered to the second satisfactory critical temperature N22 lower than the notch temperature N2 by the first temperature difference k1 after the compressor is driven, the driving of the compressor is stopped.

After the special operation algorithm is performed, if the freezing compartment temperature is lowered to the second unsatisfactory critical temperature (upper limit release temperature) N24 lower by the third temperature difference k3 than the first unsatisfactory temperature N23, the special operation algorithm is ended. The temperature of the freezing compartment is lowered to the second satisfactory critical temperature N22 through the control of the compressor cooling capacity.

Even in the state that the deep freezing compartment mode is turned off, it is necessary to intermittently control the temperature of the deep freezing compartment with a certain period to prevent the deep freezing compartment temperature from excessively increasing. Thus, the temperature control of the deep freezing compartment in a state in which the deep freezing compartment mode is turned off follows the temperature reference line for controlling the temperature of the freezing compartment disclosed in (b) FIG. 7.

As described above, the reason why the reference temperature line for controlling the temperature of the freezing compartment is applied in the state in which the deep freezing compartment mode is turned off is because the deep freezing compartment is disposed inside the freezing compartment.

That is, even when the deep freezing compartment mode is turned off, and the deep freezing compartment is not used, the internal temperature of the deep freezing compartment has to be maintained at least at the same level as the freezing compartment temperature to prevent the load of the freezing compartment from increasing.

Therefore, in the state that the deep freezing compartment mode is turned off, the deep freezing compartment notch temperature is set equal to the freezing compartment notch temperature N2, and thus the first and second satisfactory critical temperatures and the first and second unsatisfactory critical temperatures are also set equal to the critical temperatures N21, N22, N23, and N24 for controlling the freezing compartment temperature.

(c) of FIG. 7 is a view illustrating a reference temperature line for controlling the refrigerator according to a change in temperature of the deep freezing compartment in a state in which the deep freezing compartment mode is turned on.

In the state in which the deep freezing compartment mode is turned on, that is, in the state in which the deep freezing compartment is on, the deep freezing compartment notch temperature N3 is set to a temperature significantly lower than the freezing compartment notch temperature N2, i.e., is in a range of about −45° C. to about −55° C., preferably −55° C. In this case, it is said that the deep freezing compartment notch temperature N3 corresponds to a heat absorption surface temperature of the thermoelectric module 21, and the freezing compartment notch temperature N2 corresponds to a heat generation surface temperature of the thermoelectric module 21.

Since the refrigerant passing through the freezing compartment expansion valve 15 passes through the heat sink 24, the temperature of the heat generation surface of the thermoelectric module 21 that is in contact with the heat sink 24 is maintained to a temperature corresponding to the temperature of the refrigerant passing through at least the freezing compartment expansion valve. Therefore, a temperature difference between the heat absorption surface and the heat generation surface of the thermoelectric module, that is, ΔT is 32° C.

The control differential temperature m1, that is, the deep freezing compartment control differential temperature that defines a temperature section considered to be maintained to the notch temperature N3, which is the set temperature, is set higher than the freezing compartment control differential temperature k1, for example, 3° C.

Therefore, it is said that the set temperature maintenance consideration section defined as a section between the first satisfactory critical temperature N31 and the second satisfactory critical temperature N32 of the deep freezing compartment is wider than the set temperature maintenance consideration section of the freezing compartment.

In addition, when the deep freezing compartment temperature rises to the first unsatisfactory critical temperature N33, which is higher than the notch temperature N3 by the second temperature difference m2, the special operation algorithm is performed, and after the special operation algorithm is performed, when the deep freezing compartment temperature is lowered to the second unsatisfactory critical temperature N34 lower than the first unsatisfactory critical temperature N33 by the third temperature difference m3, the special operation algorithm is ended. The second temperature difference m2 may be 5° C.

Here, the second temperature difference m2 of the deep freezing compartment is set higher than the second temperature difference k2 of the freezing compartment. In other words, an interval between the first unsatisfactory critical temperature N33 and the deep freezing compartment notch temperature N3 for controlling the deep freezing compartment temperature is set larger than that between the first unsatisfactory critical temperature N23 and the freezing compartment notch temperature N2 for controlling the freezing compartment temperature.

This is because the internal space of the deep freezing compartment is narrower than that of the freezing compartment, and the thermal insulation performance of the deep freezing case 201 is excellent, and thus, a small amount of the load input into the deep freezing compartment is discharged to the outside. In addition, since the temperature of the deep freezing compartment is significantly lower than the temperature of the freezing compartment, when a heat load such as food is penetrated into the inside of the deep freezing compartment, reaction sensitivity to the heat load is very high.

For this reason, when the second temperature difference m2 of the deep freezing compartment is set to be the same as the second temperature difference k2 of the freezing compartment, frequency of performance of the special operation algorithm such as a load correspondence operation may be excessively high. Therefore, in order to reduce power consumption by lowering the frequency of performance of the special operation algorithm, it is preferable to set the second temperature difference m2 of the deep freezing compartment to be larger than the second temperature difference k2 of the freezing compartment.

A method for controlling the refrigerator according to an embodiment of the present invention will be described below.

Hereinafter, the content that a specific process is performed when at least one of a plurality of conditions is satisfied should be construed to include the meaning that any one, some, or all of a plurality of conditions have to be satisfied to perform a particular process in addition to the meaning of performing the specific process if any one of the plurality of conditions is satisfied at a time point of determination by the controller.

Figure 8:
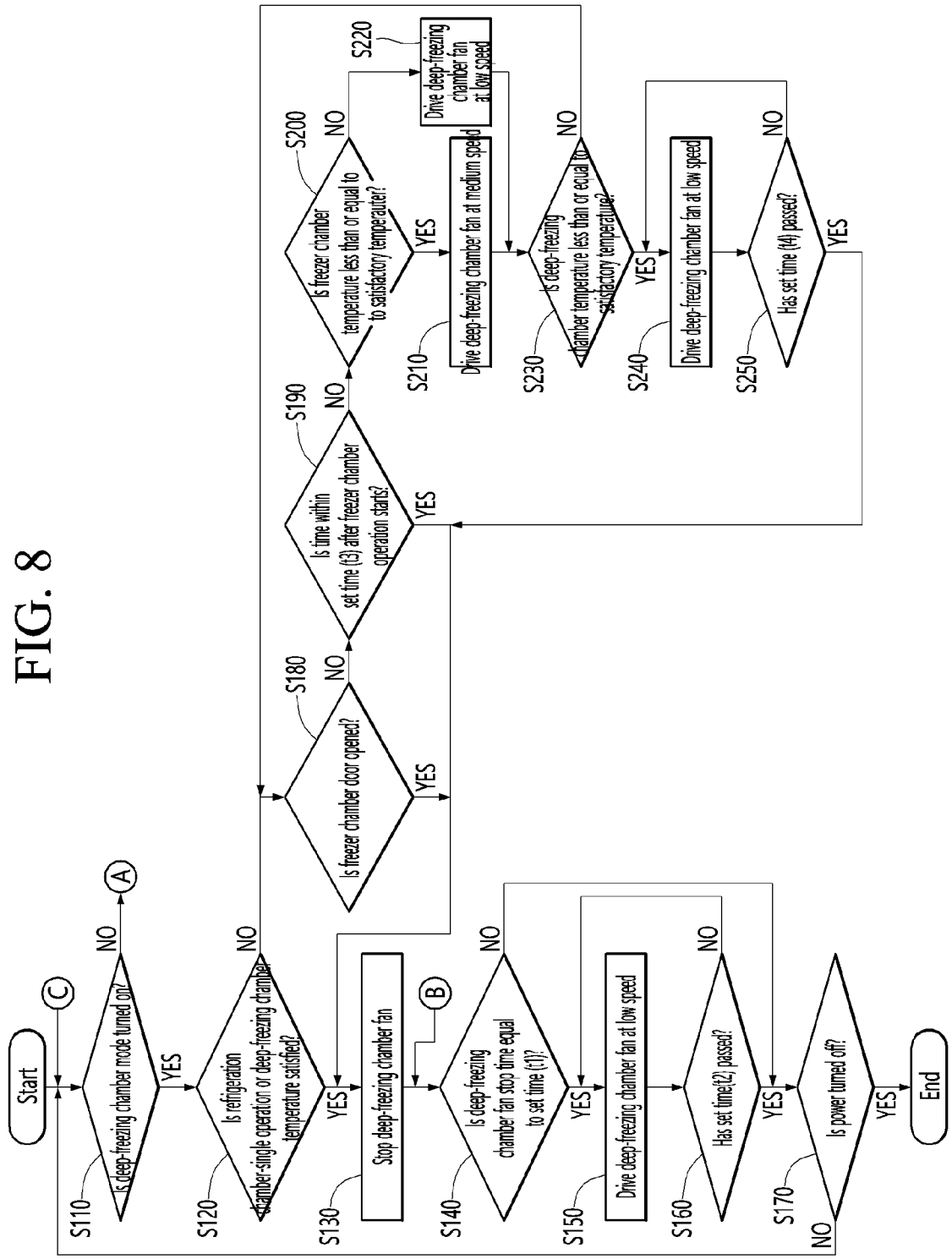
FIGS. 8 and 9 are flowcharts illustrating a method for controlling an output of a deep freezing compartment fan according to an embodiment of the present invention.
Figure 9:
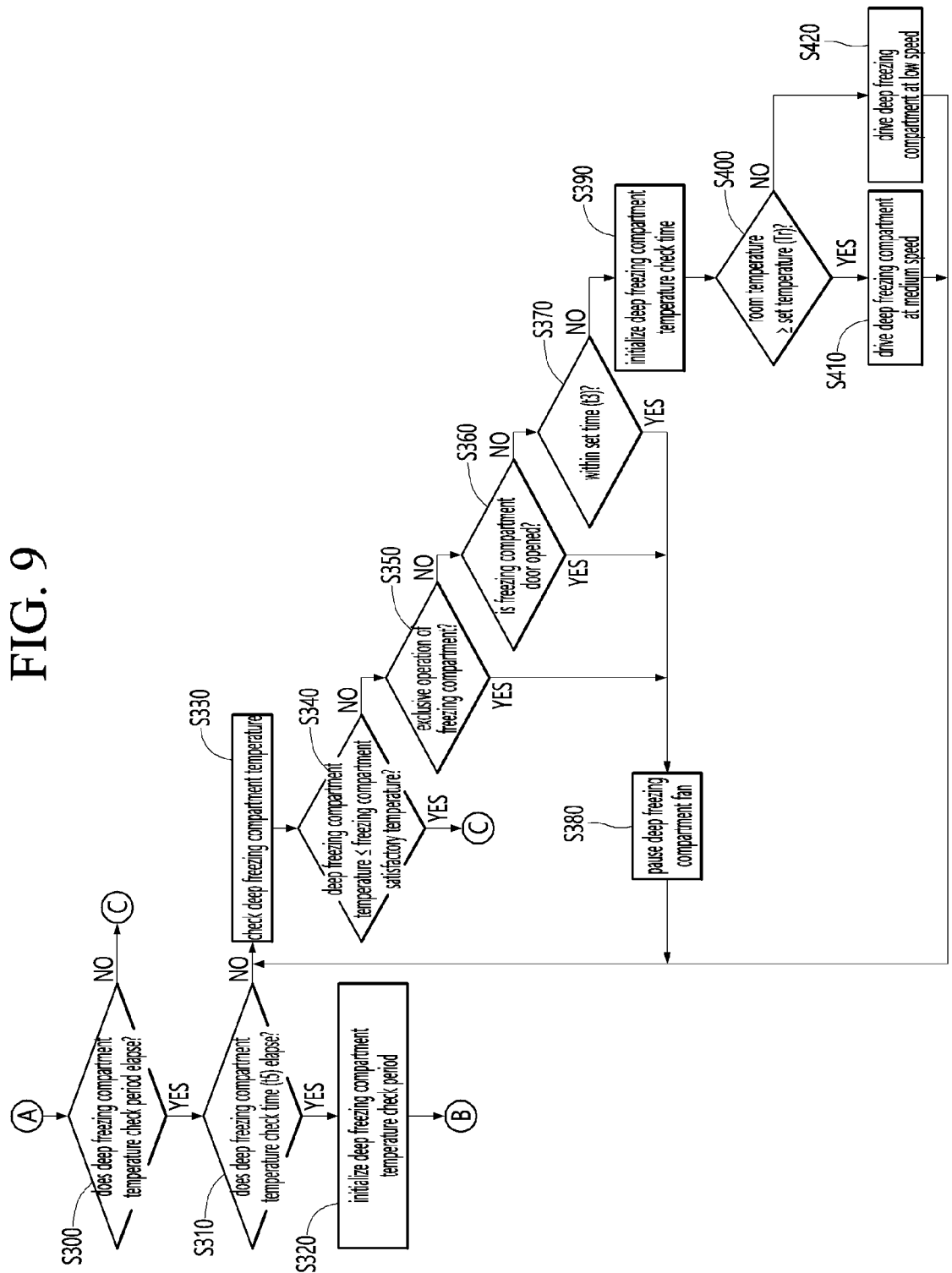

FIGS. 8 and 9 are flowcharts illustrating a method for controlling an output of a deep freezing compartment fan according to an embodiment of the present invention.

In detail, the flowchart disclosed in FIG. 8 illustrates a control method for controlling an output of the deep freezing compartment fan in a state in which the deep freezing compartment mode is turned on, and the flowchart disclosed in FIG. 9 illustrates a control method for controlling the output of the deep freezing compartment fan in a state in which the deep freezing compartment mode is turned off.

When the deep freezing compartment mode is turned on, a user presses a deep freezing compartment mode execution button to indicate that the deep freezing compartment mode is in a state capable of being performed. Thus, in the state in which the deep freezing compartment mode is turned on, power may be immediately applied to the thermoelectric module when the specific condition is satisfied.

Conversely, a state in which the deep freezing compartment mode is turned off means a state in which power supply to the thermoelectric module is cut off. Thus, power is not supplied to the thermoelectric module and the deep freezing compartment fan except for exceptional cases.

First, referring to FIG. 8, the controller determines whether the current state is the deep freezing compartment mode on state (S110). If it is determined that the current deep freezing compartment mode is in the off state, the process proceeds to a process A, which will be described in detail with reference to FIG. 9.

In detail, if it is determined that the current deep freezing compartment mode is in an on state, the controller determines whether the current operation condition is in an exclusive operation state of the refrigerating compartment, or the current deep freezing compartment temperature is in a satisfactory state (S120).

Here, in the structure in which the refrigerating compartment evaporator 16 and the heat sink 24 are connected in parallel as illustrated in FIG. 1, the exclusive operation of a specific storage compartment is defined as including the following two cases.

1) If the cooling device that cools the storage compartment is the evaporator, when an opening degree of the switching valve 13 is adjusted so that the refrigerant flows only toward the storage compartment evaporator 2) If the cooling device for cooling the storage compartment is another cooling means including the thermoelectric module, when only the cooling means of the storage compartment operates In another aspect, the deep freezing compartment operation may not be performed because the deep freezing compartment is in the satisfactory temperature region. However, although the deep freezing compartment operation is not in the satisfactory temperature region, the deep freezing compartment operation may not be performed for other reasons.

Therefore, operation S120 includes a process of determining whether the current operation condition is a condition in which a cooling operation for cooling the deep freezing compartment is not performed, and/or whether the deep freezing compartment cooling operation is not performed because the current operation condition is in the satisfactory temperature region through the controller.

In still another aspect, operation S120 includes determining whether the current operation condition is in a situation in which the supply of refrigerant to the heat sink for cooling the deep freezing compartment is blocked, and/or whether the deep freezing compartment is in the satisfactory temperature range.

Here, the condition that the deep freezing compartment is in the satisfactory state means that the temperature of the deep freezing compartment is in the satisfactory temperature region A of the deep freezing compartment illustrated in (c) of in FIG. 7.

The exclusive operation of the refrigerating compartment means a situation in which the switching valve 13 is switched toward the refrigerating compartment expansion valve 14 for cooling the refrigerating compartment, and thus, the refrigerant flows only toward the refrigerating compartment expansion valve 14.

If the refrigeration compartment is exclusively operating, or the deep freezing compartment temperature is in the satisfactory state, the deep freezing compartment fan is paused or maintained in a paused state (S130).

When the refrigerating compartment is exclusively operating, since the refrigerant does not flow toward the freezing compartment expansion valve 15, it means that the refrigerant does not flow even through the heat sink 24. Therefore, in this state, since the thermoelectric module is in a state in which a function as the cooling member is not performed, the deep freezing compartment fan 25 is controlled not to be driven.

If the current deep freezing compartment temperature is the satisfactory temperature state, since there is no need to drive the deep freezing compartment fan, it will be natural that the deep freezing compartment fan 25 is controlled not to be driven.

The controller determines whether a pause time of the deep freezing compartment fan continues for more than a set time $t_1$ (S140). Here, the set time $t_1$ may be 60 minutes, but is not limited thereto.

If the deep freezing compartment fan is maintained in the stationary state for a long time in the cryogenic state inside the deep freezing compartment, the deep freezing compartment fan and a rotating shaft are frozen, and thus a phenomenon in which the rotation shaft does not rotate even when power is applied may occur. Therefore, when the pause state of the deep freezing compartment fan is maintained for more than the set time $t_1$, the controller drives the deep freezing compartment fan at a low speed (S150). When the set time $t_2$ elapses, the controller pauses the deep freezing compartment fan (S160), determines whether the refrigerator is powered off (S170) to end the operation of the deep freezing compartment fan driving algorithm or to continuously repeat the operation.

Here, the set time $t_2$ in which the deep freezing compartment fan is driven at the low speed may be 10 seconds, but is not limited thereto.

On the other hand, in the process of determining whether the refrigerating compartment is exclusively operating (S120), if it is determined that the refrigerating compartment is not exclusively operating, and the temperature of the deep freezing compartment is not in the satisfactory state, a process of determining whether the freezing compartment door is in an open state is performed (S180).

Here, it is said that the refrigerating compartment does not exclusively operate means any one of the exclusive operation of the freezing compartment or the simultaneous operation for cooling the refrigerating compartment and the freezing compartment at the same time.

If it is determined that the freezing compartment door is in the open state, the deep freezing compartment fan is paused, or the process proceeds to the process (S130) of maintaining the paused state.

In a state in which the freezing compartment door is opened, there may be a situation in which food is put in or food is taken out by opening the inside of the freezing compartment or the deep freezing compartment drawer. Therefore, when it is determined that the freezing compartment door is in the open state, the deep freezing compartment fan is controlled not to be driven.

In addition, if it is determined that the freezing compartment door is closed, the controller determines whether a set time $t_3$ elapses after the freezing compartment operation starts (S190).

When it is determined that the current time point is a state in which the set time does not elapse after the start of the operation of the freezing compartment, the process proceeds to the process S130 of pausing the deep freezing compartment fan or maintaining the paused state of the deep freezing compartment fan.

That is, when it is determined that the current deep freezing compartment mode is in the on state, the controller controls the refrigerator to proceed to operation S130 when the current operation condition satisfies at least one of the conditions of operations S120, S180, and S190 described above. It is natural that this should be interpreted as including a case in which all the conditions of operations S120, S180, and S190 are satisfied.

In addition, the operations S180 and S190 are sequentially performed, but there is no limitation in order of execution.

Since it is important to lower the freezing compartment temperature to a set level at the initial process of the operation of the freezing compartment, the refrigerant passing through the freezing compartment expansion valve 15 is controlled to be heat-exchanged intensively with the cold air in the freezing compartment for a predetermined time.

The set time $t_3$ may be 90 seconds, but is not limited thereto.

In addition, if it is determined that the set time $t_3$ elapses after the start of the freezing compartment operation, the controller determines whether the current freezing compartment temperature is the satisfactory temperature (S200).

That is, when it is determined that the current deep freezing compartment mode is in the on state, the controller may be summarized to proceed to operation S200 if the current operation conditions do not satisfy all of the conditions of operations S120, S180, and S190 described above.

If it is determined that the freezing compartment temperature is not in the satisfactory temperature state, the deep freezing compartment fan is driven at the low speed (S220), and thus, the freezing compartment temperature is quickly cooled to the satisfactory region A illustrated in (c) of FIG. 7.

On the other hand, if it is determined that the freezing compartment temperature is in the current satisfactory range, the deep freezing compartment fan is driven at the medium speed (S210), and thus, the deep freezing compartment is cooled to a set temperature. When the freezing compartment temperature is in the satisfactory temperature state, the freezing compartment fan is not driven, and thus, heat exchange may not substantially occur in the freezing compartment evaporator 17. Therefore, it is preferable to increase in rotation speed of the deep freezing compartment fan so that the refrigerant passing through the heat sink 24 is heat-exchanged with the cool deep freezing compartment to rapidly cool the deep freezing compartment temperature to a set temperature.

On the other hand, it is continuously determined whether the deep freezing compartment temperature enters the satisfactory region while the deep freezing compartment fan is being driven at the low speed or the medium speed. That is, the deep freezing compartment temperature sensor (not shown) mounted on a front surface of the deep freezing temperature module and exposed to the cold air of the deep freezing compartment continuously detects the deep freezing compartment temperature and transmits the detected result to the controller.

The controller determines whether the deep freezing compartment temperature enters the satisfactory region A based on the transmitted deep freezing compartment temperature sensing value (S230).

If it is determined that the deep freezing compartment temperature is not in the satisfactory state, the process returns to the process (S180) of determining whether the freezing compartment door is opened, and the subsequent process is repeated.

However, the present invention is not limited to returning to operation S180, and it is also possible to control the return to any one of operations S120, S190, and S200.

Here, a situation in which the user opens the freezing compartment door while the deep freezing compartment fan is being driven at the low speed or the medium speed may occur, and in this case, it is necessary to immediately pause the deep freezing compartment fan. Thus, when the deep freezing compartment fan is operating, and the deep freezing compartment temperature is not in the satisfactory region, it is necessary for the controller to continuously or periodically detect whether the freezing compartment door is opened.

If it is determined that the deep freezing compartment temperature drops to the satisfactory region, the deep freezing compartment fan is controlled to be driven at the low speed (S240). If the deep freezing compartment temperature is being driven at the low speed even when the temperature is in the unsatisfactory state, the low speed operation is maintained, and if it is being driven at the medium speed or higher, the speed is changed to the low speed.

If it is determined that a low speed driving time of the deep freezing compartment fan elapses over the set time $t_4$ in the state in which the deep freezing compartment temperature is in the satisfactory region (S250), the process proceeds to the process (S130) of pausing the deep freezing compartment fan. The process of determining whether the pause time of the deep freezing compartment fan exceeds the set time $t_1$ is repeatedly performed. The set time $t_4$ may be 90 seconds, but is not limited thereto.

Here, the reason for further driving the deep freezing compartment fan for the set time $t_4$ even after the deep freezing compartment temperature is within the satisfactory region is as follows. In detail, even if the power supplied to the thermoelectric element 21 is cut off due to the end of the deep freezing compartment cooling operation, the cold sink 22 of the module 20 is maintained in a state below the deep freezing compartment temperature for a certain time period. This is for maximally supplying the cold air, which remains in the cold sink, to the deep freezing compartment.

In other words, even after the power supply to the thermoelectric element is cut off, while the temperature of the cold sink 22 is maintained below the temperature of the deep freezing compartment, the cold sink 22 and the cold sink 22 may be heat-exchanged heat with each other. This is for more absorbing heat from the deep freezing compartment into the cold sink 22.

As described above, if the remaining cooling air remaining in the cold sink 22 is used maximally, cooling capacity and efficiency of the thermoelectric module may be improved.

However, when the deep freezing compartment temperature enters the satisfactory temperature range, it is also possible to directly proceed to operation S130 of pausing the deep freezing compartment fan without performing operations S240 and S250 of additionally driving the deep freezing compartment fan.

As another example, if it is determined that the current deep freezing compartment mode is in the on state, the controller does not separately determine whether the freezing compartment temperature is satisfied when the current operation conditions do not satisfy all of the conditions of operations S120, S180, and S190 described above, and as a result, it may be also possible to control the deep freezing compartment fan to be driven at a specific speed. It should be noted here that the specific speed may include other speeds in addition to the low and medium speeds.

As another embodiment, even if at least one of operations S120, S180, and S190 is not satisfied, it is possible to directly proceed to operation S200, or to directly proceed to the process of rotating the deep freezing compartment fan at the specific speed.

On the other hand, if the controller determines that the deep freezing compartment mode is in the off state in operations S110 of FIG. 8, the algorithm illustrated in FIG. 9 is executed.

In the temperature range in which the temperatures of all storage compartments are satisfied, a pump down operation may be performed to collect the refrigerant in the evaporators to the condenser before the compressor enters an idle period. In this case, it may be possible to rotate the deep freezing compartment fan at the low speed or the medium speed while the pump down operation is performed.

Referring to FIG. 9, if it is determined that the current deep freezing compartment mode is in the off state, the controller periodically turns on the deep freezing compartment temperature sensor for a predetermined time to check the deep freezing compartment temperature.

In detail, since the power supplied to the deep freezing compartment is completely cut off in the state in which the deep freezing compartment mode is turned off, the deep freezing compartment temperature may not be detected. Then, an increasing heat load in the deep freezing compartment may be transferred to the freezing compartment, resulting in an increase in freezing compartment load. In order to prevent this phenomenon, the temperature sensor is periodically turned on to detect an internal temperature of the deep freezing compartment in the off state of the deep freezing compartment mode.

In detail, the controller determines whether a deep freezing compartment temperature check period elapses (S300), and if it is determined that the temperature check period does not elapse, the process proceeds to a process C and then to repeatedly perform a process (S110) of determining whether the deep freezing compartment mode is in the on state (S110).

The deep freezing compartment temperature check cycle may be 4 minutes, but is not limited thereto.

Conversely, if it is determined that the deep freezing compartment temperature check period elapses, the controller determines whether the deep freezing compartment temperature check time $t_5$ elapses (S310).

In detail, the elapse of the deep freezing compartment temperature check period may be interpreted as reaching the deep freezing compartment temperature check time. That is, it means that 4 minutes elapses, and a time to check the deep freezing compartment temperature is reached.

When the deep freezing compartment temperature check cycle elapses, power is supplied to the deep freezing compartment temperature sensor to make it possible to check the deep freezing compartment temperature. Here, the deep freezing compartment temperature sensor may check the deep freezing compartment temperature until the deep freezing compartment temperature check time elapses (330). The deep freezing compartment temperature check time may be 1 minute, but is not limited thereto.

If the controller determines that the deep freezing compartment temperature check time elapses, the deep freezing compartment temperature check cycle is initialized (S320), so that a timer is reset to 4 minutes. Of course, when the deep freezing compartment temperature check cycle is initialized, and the cycle is reset, the deep freezing compartment temperature check time is also reset to zero.

After the deep freezing compartment temperature check period is initialized, the process proceeds to a process B, and the process (S140) of determining whether the pause time of the deep freezing compartment fan illustrated in FIG. 8 elapses over a set time $t_1$ is performed.

On the other hand, the controller determines whether the deep freezing compartment temperature transmitted from the deep freezing compartment temperature sensor within the deep freezing compartment temperature check time is equal to or less than the freezing compartment satisfactory temperature (S340). The reason is, as described in (b) of FIG. 7, done for a reason in which the temperature of the deep freezing compartment is maintained at least the same as the temperature of the freezing compartment in the state that the deep freezing compartment mode is the off state.

In detail, if it is determined that the deep freezing compartment temperature is the freezing compartment satisfactory temperature, that is, the deep freezing compartment temperature is within the freezing compartment satisfactory temperature region A illustrated in (b) of FIG. 7, since it is unnecessary to drive the deep freezing compartment fan in order to control the deep freezing compartment temperature, the process returns to the process (S110) of determining whether the deep freezing compartment mode is in the on state.

On the other hand, if it is determined that the deep freezing compartment temperature is higher than the freezing compartment satisfactory temperature, like as in the state in which the deep freezing compartment mode is in the on state, at least one or more determination processes of a process (S350) of determining whether the refrigerating compartment is exclusively operating, a process (S360) of determining whether the freezing compartment door is opened, and a process (S370) of determining whether the set time $t_3$ elapses after the freezing compartment operation starts. It should be noted that, when a plurality of determination processes among the determination processes that are performed in operations S350, S360, and S370 are sequentially performed, there is no restriction in order of their execution.

If it is determined that the state belongs to any one or all of the cases in which the deep freezing compartment temperature is within the freezing compartment satisfactory temperature region A, the refrigerating compartment is exclusively operating, and the freezing compartment door is opened, which are illustrated in (b) of FIG. 7, the deep freezing compartment fan is paused or maintained in the paused state (S380).

A process (S240) of determining whether the deep freezing compartment temperature is within the freezing compartment satisfactory temperature region A illustrated in (b) of FIG. 7 by checking the temperature of the deep freezing compartment.

Here, if it is determined that the deep freezing compartment temperature is within the freezing compartment satisfactory temperature region (A) illustrated (b) of in FIG. 7, the process proceeds to operation S110, and if it is determined that the refrigerator compartment is exclusively operating, the freezer compartment door is opened, or the set time $t_3$ does not elapse after the freezer compartment is driven, the process does not proceed to operation S110, but a process (S330) of checking the temperature of the deep freezing compartment is repeatedly performed.

When the deep freezing compartment temperature is the unsatisfactory temperature of the freezing compartment, the refrigerating compartment does not operate exclusively, the freezing compartment door is closed, and the set time $t_3$ elapses after starting the freezing compartment operation, the controller initializes the deep freezing compartment temperature check time (S390). The controller determines whether the room temperature is equal to or greater than the set temperature TR (S400). The set temperature TR may be 38° C., but is not limited thereto.

As another example, it may include a method of omitting operation S400 and immediately rotating the deep freezing compartment fan at a specific speed. It should be noted that the specific speed has the same meaning as the specific speed described in FIG. 8.

In detail, when it is determined that the room temperature is equal to or higher than a set temperature TR, the controller drives the deep freezing compartment fan at the medium speed (S410), and when it is determined that the room temperature is less than the set temperature TR, the deep freezing compartment fan is driven at the low speed (S420).

Here, the reason for driving the deep freezing compartment fan even if the current state is in a state in which the deep freezing compartment mode is the off state is because, when a set time elapses after the freezing compartment cooling operation starts, even if power is not applied to the thermoelectric module 21, the thermoelectric module 21 is cooled to the temperature of the refrigerant passing through at least the freezer compartment expansion valve 15.

In other words, when the freezing compartment operation is performed, since the refrigerant passing through the freezing compartment expansion valve 15 passes through the heat sink 24 to move to the freezing compartment evaporator 17, the heat sink 24 is also cooled to a temperature of about 18° C. Then, the thermoelectric element 21 in contact with the heat sink 24 and the cold sink 22 attached to the front surface of the thermoelectric element 21 are also cooled to a temperature similar to that of the heat sink 24.

Therefore, even if power is not applied to the thermoelectric element 21, since the thermoelectric module 20 itself functions as a single cooling member, the deep freezing compartment may be maintained in a notch temperature (N2) range through the heat exchange between the thermoelectric module 20.

A process (S330) of checking the temperature of the deep freezing compartment while the deep freezing compartment fan is driven at the low speed or the medium speed is repeatedly performed to determine whether the deep freezing compartment temperature reaches the freezing compartment satisfactory temperature.

As described above, even in the state that the deep freezing compartment mode is turned off, the deep freezing compartment temperature may be periodically checked to maintain the deep freezing compartment temperature to the freezing compartment temperature, thereby preventing the deep freezing compartment temperature from rising excessively, and as a result, reducing power consumption. The reason is that, when the load of the deep freezing compartment increases once beyond the unsatisfactory temperature or the upper limit input temperature, it takes a considerable time to lower the temperature to the satisfactory temperature as well as consume a lot of power. Therefore, even when the deep freezing compartment mode is turned off, the deep freezing compartment temperature is maintained to at least a satisfactory temperature for the freezing compartment. Thereafter, when a deep freezing compartment mode on command is input, a time taken to lower the deep freezing compartment temperature to the notch temperature N3 may be saved to minimize the power consumption.

Figure 10:
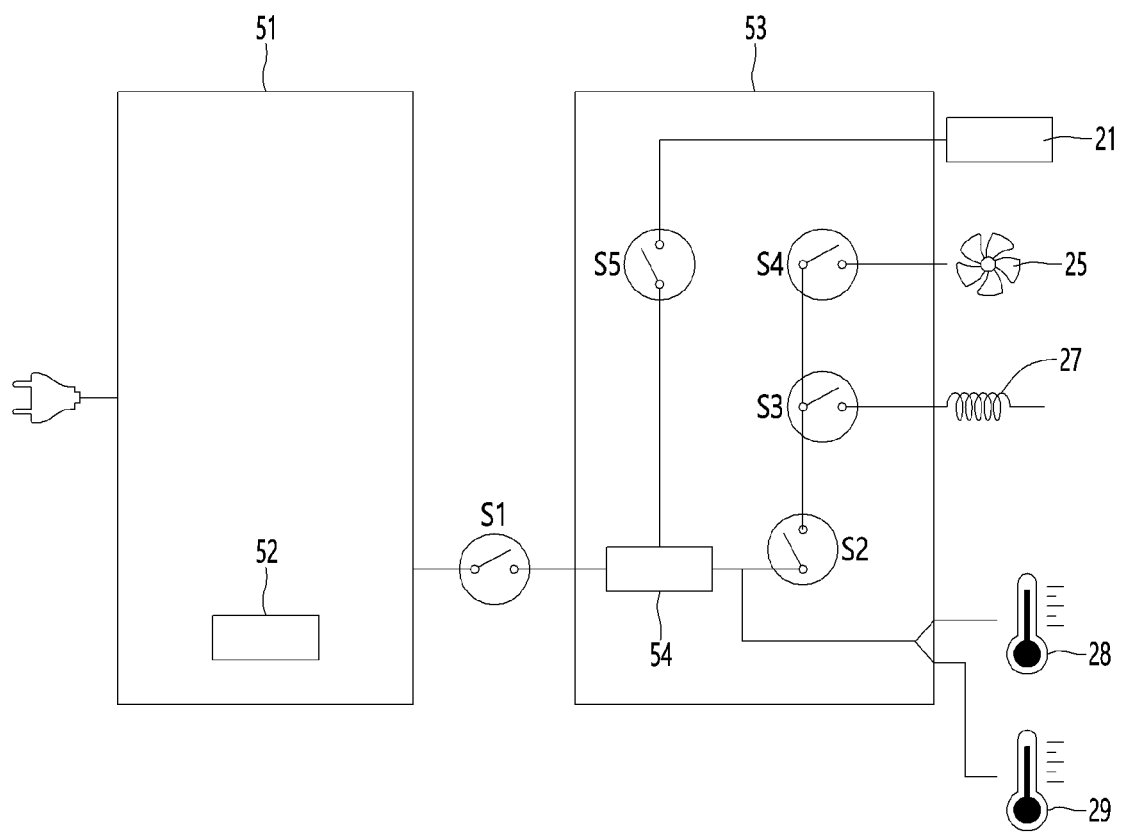
FIG. 10 is a view illustrating a control configuration according to another embodiment of the present invention.

FIG. 10 is a view illustrating a control configuration according to another embodiment of the present invention.

Referring to FIG. 10, in a case of a refrigerator equipped with a deep freezing compartment, when the refrigerator is controlled through a single printed circuit board (PCB), even in a state in which the deep freezing compartment mode is turned off, standby power may be applied to a thermoelectric element 21, a deep freezing compartment fan 25, a heater 27 provided in the deep freezing compartment, and sensors 28 and 29 to increase in power consumption.

In order to solve such a disadvantage, a separate PCB for controlling the deep freezing compartment may be provided, and power may be periodically supplied when the deep freezing compartment mode is in an off state.

In detail, the refrigerator according to this embodiment may include a main PCB 51 and a sub PCB 52, which are electrically connected by a first switch S1.

A main controller 52 is provided on the main PCB 51, and a sub controller 54 is provided on the sub PCB 52. A defrost sensor 29 for defrosting the thermoelectric module and a temperature sensor 29 for checking a temperature of the deep freezing compartment are connected to the sub PCB 53, and when the first switch S1 is turned on, power is supplied to the temperature sensor 28 and the defrost sensor 29.

In addition, the heater 27 may include at least one of a drain heater and a gasket heater, and is electrically connected to the sub controller 54 by second to fourth heaters S2, S3, and S4.

The thermoelectric element 21 is electrically connected to the sub controller 54 by a fifth switch S5.

When the deep freezing compartment mode is in an on state, all the switches S1 to S5 are turned on, and power is always supplied from the main PCB 51 to the sub PCB 53.

On the other hand, when the deep freezing compartment mode is in an off state, the first switch S1 is turned on only when the deep freezing compartment temperature check cycle is reached so that the deep freezing compartment temperature is checked, and when the deep freezing compartment temperature is greater than or equal to a freezing compartment satisfactory temperature, the second and fourth switches S2 and S4 are turned on, and the deep freezing compartment fan 25 is controlled to rotate at a low speed or a medium speed.

As described above, since the main controller and the sub controller for only controlling the deep freezing compartment are separately provided, there may be the advantage that the main controller is shared. That is, the main controller is commonly applied not only to refrigerators equipped with the deep freezing compartment but also to refrigerators without the deep freezing compartment, and the sub controller is installed only in refrigerators equipped with the deep freezing compartment to reduce PCB manufacturing costs.

The invention claimed is:

1. A refrigerator, comprising:
a refrigerating compartment;
a freezing compartment that is partitioned from the refrigerating compartment;
a deep freezing compartment accommodated in the freezing compartment and partitioned from the freezing compartment;
a thermoelectric module to cool the deep freezing compartment to a temperature lower than that of the freezing compartment;
a temperature sensor to detect a temperature at the deep freezing compartment;
a deep freezing compartment fan to cause an internal air of the deep freezing compartment to forcibly flow; and
a controller configured to control driving of the deep freezing compartment fan,
wherein the controller is configured to:
determine whether a deep freezing compartment mode is turned on or off;
intermittently turn on the temperature sensor with a certain period to detect the temperature at the deep freezing compartment for a first set time through the temperature sensor when the deep freezing compartment mode is turned off; and
receive the detected temperature at the deep freezing compartment from the temperature sensor.

2. The refrigerator according to claim 1, wherein, when the controller determines that the temperature at the deep freezing compartment detected by the temperature sensor is in an unsatisfactory temperature region of the freezing compartment, the controller is configured to drive the deep freezing compartment fan until the temperature at the deep freezing compartment drops to a satisfactory temperature region of the freezing compartment.

3. The refrigerator according to claim 2, wherein the controller is configured to set a driving speed of the deep freezing compartment fan differently according to a room temperature.

4. The refrigerator according to claim 3, wherein, when the room temperature is equal to or higher than a set temperature, the controller is configured to drive the deep freezing compartment fan at a medium speed, and
    when the room temperature is less than the set temperature, the controller is configured to drive the deep freezing compartment fan at a low speed.

5. The refrigerator according to claim 2, wherein, in a state in which the temperature at the deep freezing compartment is higher than the satisfactory temperature region of the freezing compartment, when corresponding to at least one of below cases:
    a case in which the refrigerating compartment is exclusively operated,
    a case in which a freezing compartment door is opened, or
    a case in which a second set time does not elapse after an operation of the freezing compartment starts,
    the controller is configured to stop the deep freezing compartment fan or maintain a stopped state.

6. The refrigerator according to claim 5, wherein the second set time is 90 seconds.

7. The refrigerator according to claim 4, wherein the set temperature is 38° C.

8. The refrigerator according to claim 1, wherein the certain period is 4 minutes, and
    the first set time is 1 minute.

9. The refrigerator according to claim 2, wherein, when the controller determines that the certain period has not elapsed, or the temperature at the deep freezing compartment drops to the satisfactory temperature region of the freezing compartment, the controller is configured to perform the determining of whether the deep freezing compartment mode is turned on or off.

10. The refrigerator according to claim 2, wherein, when the controller determines that the first set time for checking the deep freezing compartment temperature has elapsed,
    the controller is configured to determine whether a stop time of the deep freezing compartment fan is maintained for more than a third set time.

11. The refrigerator according to claim 10, wherein the third set time is 60 minutes.

12. The refrigerator according to claim 10, wherein, when the controller determines that the stop time of the deep freezing compartment fan is maintained for more than the third set time, the controller is configured to drive the deep freezing compartment fan for a fourth set time at a low speed, and
    when the fourth set time elapses, the controller is configured to perform the determining of whether the deep freezing compartment mode is turned on or off.

13. The refrigerator according to claim 12, wherein the fourth set time is 10 seconds.

14. The refrigerator according to claim 1, wherein, when the deep freezing compartment mode is in an on state, the temperature sensor is maintained in an on state to continuously detect the deep freezing compartment temperature,
    when the controller determines that the received temperature at the deep freezing compartment is in a satisfactory temperature region of the deep freezing compartment, the controller is configured to stop the deep freezing compartment or maintain in a stopped state, and
    when the controller determines that the received temperature at the deep freezing compartment is in an unsatisfactory temperature region of the deep freezing compartment, the controller is configured to drive the deep freezing compartment fan.

15. The refrigerator according to claim 14, wherein, even though the temperature at the deep freezing compartment temperature is in the unsatisfactory temperature region of the deep freezing compartment, when corresponding to at least one of below cases:
    a case in which the refrigerating compartment is exclusively operated,
    a case in which a freezing compartment door is opened, or
    a case in which a second set time does not elapse after an operation of the freezing compartment starts,
    the controller is configured to stop the deep freezing compartment fan or maintain in a stopped state.

16. The refrigerator according to claim 15, wherein, when the controller determines that the temperature of the deep freezing compartment is in the unsatisfactory temperature region of the deep freezing compartment, the controller is configured to determine whether a temperature at the freezing compartment is in a satisfactory temperature region of the freezing compartment to determine a driving speed of the deep freezing compartment fan.

17. The refrigerator according to claim 16, wherein, when the controller determines that the temperature at the freezing compartment is in the satisfactory temperature region of the freezing compartment, the controller is configured to drive the deep freezing compartment fan at a medium speed, and
    when the controller determines that the temperature at the freezing compartment is not in the satisfactory temperature region of the freezing compartment, the controller is configured to drive the deep freezing compartment fan at a low speed.

18. The refrigerator according to claim 17, wherein, when the controller determines that the temperature at the deep freezing compartment dropped to the satisfactory temperature region of the deep freezing compartment, the controller is configured to further drive the deep freezing compartment fan for a fifth set time at a low speed and then be stopped.

19. The refrigerator according to claim 18, wherein the fifth set time is 90 seconds.

20. The refrigerator according to claim 14, wherein, in the state in which the deep freezing compartment fan is stopped, the controller is configured to determine whether a stop time of the deep freezing compartment fan is maintained for more than a third set time.

21. The refrigerator according to claim 20, wherein the third set time is 60 minutes.

22. The refrigerator according to claim 20, wherein, when the controller determines that the stop time of the deep freezing compartment fan is maintained for more than the third set time, the controller is configured to drive the deep freezing compartment fan for a fourth set time at a low speed, and
    when the fourth set time elapses, the controller is configured to perform the determining of whether the deep freezing compartment mode is turned on or off.

* * * * *